US011132367B1

(12) United States Patent
Chud

(10) Patent No.: US 11,132,367 B1
(45) Date of Patent: Sep. 28, 2021

(54) AUTOMATIC CREATION OF INDEXES FOR DATABASE TABLES

(71) Applicant: Amazon Technologies, Inc., Seattle, WA (US)

(72) Inventor: Andrew Christopher Chud, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 331 days.

(21) Appl. No.: 15/614,913

(22) Filed: Jun. 6, 2017

(51) Int. Cl.
*G06F 16/24* (2019.01)
*G06F 16/2455* (2019.01)
*G06F 16/242* (2019.01)
*G06F 16/2453* (2019.01)

(52) U.S. Cl.
CPC ...... *G06F 16/24554* (2019.01); *G06F 16/244* (2019.01); *G06F 16/24535* (2019.01)

(58) Field of Classification Search
CPC ............. G06F 16/24554; G06F 16/244; G06F 16/24535
See application file for complete search history.

(56) References Cited

U.S. PATENT DOCUMENTS

| | | | |
|---|---|---|---|
| 6,778,977 B1 | 8/2004 | Avadhanam et al. | |
| 7,047,250 B1 | 5/2006 | Agarwal et al. | |
| 7,111,020 B1 | 9/2006 | Gupta et al. | |
| 8,103,689 B2 | 1/2012 | Gupta et al. | |
| 2003/0093408 A1 | 5/2003 | Brown et al. | |
| 2003/0233465 A1* | 12/2003 | Le | H04L 67/40 709/231 |
| 2004/0167922 A1 | 8/2004 | Yanase et al. | |
| 2007/0282798 A1* | 12/2007 | Akilov | G06F 16/284 |
| 2008/0120280 A1 | 5/2008 | Iijima et al. | |
| 2013/0311488 A1 | 11/2013 | Erdogan et al. | |
| 2016/0085832 A1 | 3/2016 | Lam | |
| 2016/0335319 A1 | 11/2016 | Teodorescu et al. | |
| 2016/0335334 A1 | 11/2016 | Teodorescu et al. | |
| 2016/0378824 A1* | 12/2016 | Li | G06F 16/2255 707/715 |
| 2017/0060941 A1 | 3/2017 | Yan et al. | |
| 2018/0129691 A1* | 5/2018 | Mathur | G06F 16/24553 |

OTHER PUBLICATIONS

U.S. Appl. No. 15/458,645, filed Mar. 14, 2017, Andrew Christopher Chud.

* cited by examiner

*Primary Examiner* — Loc Tran
(74) *Attorney, Agent, or Firm* — Robert C. Kowert; Kowert, Hood, Munyon, Rankin & Goetzel, P.C.

(57) ABSTRACT

Systems and methods are disclosed to implement the automatic creation of an auto-partitioning second index (APSI) for a storage object in a storage service. According to embodiments, when a query to the storage object is received specifying a sort condition based on an attribute of the storage object, the storage service may determine that an APSI should be created to optimize for queries with that type of sort condition. The storage service then automatically creates a new APSI that is partitioned according to an auto-generated partition key and stores the data in sorted order in each partition based on the attribute as a sort key. Later queries to the storage object specifying the same type of sort condition are forwarded to the new APSI. A query directed to the APSI is divided into subqueries sent to APSI's partitions in parallel, and results are aggregated to produce the final query result.

20 Claims, 15 Drawing Sheets

```
Table 602: {

Table Name 604: string

Attribute Definitions 606: [
        {
            Attribute Name: string
            Attribute Type: string
        }
    ]
    ...

Auto Partitioned Indexes 610: [
        {
            Index Name 612: string
            Index Status 614: string
            Partition Count 616: number
            Min Partition Count 617: number
            Max Partition Count 618: number
            Max Partition Frequency 619: number Key Schema 620: [
                {
                    Attribute Name 622: string
                    Key Type 624: string
                }
            ]

Partitions 630: [
                {
                    Partition Name 632: string
                    Partition Item Count 634: number
                    Partition Size Bytes 636: number
                }
            ]
            ...
        }
    ]
    ...
}
```

TABLE SETTINGS 1300

| KEYS / ATTRIBUTES 1302 | PROV THROUGHPUT 1304 | APSI AUTO CREATE 1306 |

☒ ALLOW QUERIES TO TRIGGER CREATION OF AUTO PARTITIONED SECONDARY INDEX (APSI) 1310

MAXIMUM NUMBER OF APSI ALLOWED: 3  1320

ATTRIBUTE PROJECTION FOR APSI: 1330
● PROJECT ALL ATTIRBUTES FROM TABLE
○ PROJECT ONLY QUERY ATTRIBUTES

HANDLING OF TRIGGERING QUERY: 1340
● PERFORM THE QUERY USING TABLE
○ GENERATE EXCEPTION TO RETRY AFTER CREATION OF APSI

AUTOMATIC CREATION OF INDEXES FOR DATABASE TABLES

BACKGROUND

Database systems managing large amounts of data on behalf of users may receive a high volume of request traffic to access data and to manage the storage of data. Different mechanisms for structuring, arranging, or otherwise making data available may be implemented in order to service requests. In some databases, secondary indexes provide an alternative arrangement of data stored in a database system which may be accessed more efficiently for particular types of information requests. That is, data stored in one fashion at a database table may be stored in a different fashion at a secondary index. Such indexing may provide a number of performance benefits to the user. However, the benefits of secondary indexes in particular situations may not always apparent to the average database user or administrator. Moreover, the secondary indexes themselves may include numerous configuration parameters, making their manual creation a burdensome and tedious task. These problems generally reduce the usability of secondary indexes in databases.

BRIEF DESCRIPTION OF THE DRAWINGS

FIG. 6 illustrates an exemplary schema that may be used to describe an auto-partitioning secondary index, according to some embodiments.

FIG. 13 illustrates an example user interface to configure the auto-creation of an auto-partitioning secondary index, according to some embodiments.

Figure 1:
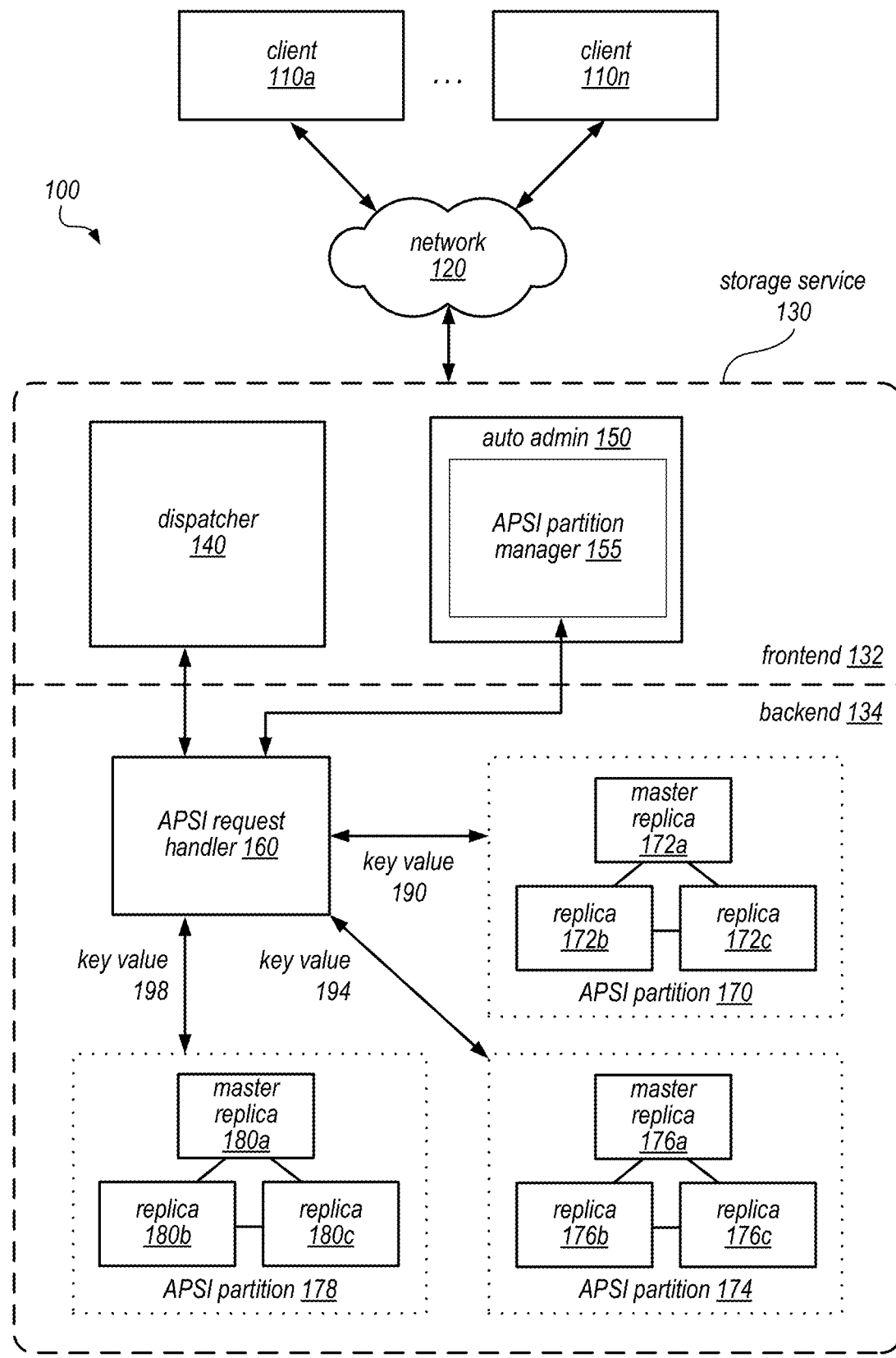
FIG. 1 is a block diagram illustrating an example computer system that implements an auto-partitioning secondary index, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

The systems and methods described herein may be employed in various combinations and in various embodiments to implement auto-partitioning secondary indexes (APSI) for tables in a non-relational data store.

Non-relational data stores offer accessible and scalable storage to one or more different clients. Tables of items, which may include one or more data values or attributes, may be stored, managed and accessed according to a key value pair that uniquely identifies an item in the table. For instance, a table that stores items for pizza orders may include the following attributes: an order identifier, a store identifier, a customer zip code, and an order time. In this table, the order identifier may be the primary key, which is unique for each item.

In some embodiments, a table may have a partition key that determines which partition an item is stored in. Key-partitioned tables are thus stored in a plurality of partitions based on the partition key. In some embodiments, each partition may be independently managed by a group of compute nodes, such that accesses to the data in one partition are handled by the nodes that manage that partition. In some embodiments, the partition key may be a different attribute from the primary key. For example, the pizza order table may be partitioned using the store identifier, in which case the items are partitioned according to their store identifier.

In some embodiments, a secondary index may be generated for the table such that the data may be organized and accessed based on a different partition key than the table's partition key, which may be the partition key of the table's primary index. For example, a secondary index may be created for the pizza order table above, which is partitioned based on the zip code attribute. Moreover, in some embodiments, the items may be stored in sorted order within each partition. For example, within each zip code partition in the pizza order table, the pizza order items may be stored in sorted order according to the order time attribute. Thus, the zip code attribute in the secondary index may be the partition key for the index, and the order time attribute may be referred to as a sort key for the index. In this way, an access request for orders that specifies a particular range of order times within a specific zip code may be quickly obtained without performing a scan of the entire table, which is partitioned according to the store identifier.

While secondary indexes can provide useful alternatives access capabilities to data, they pose a number of problems for the user. First, the index's partition key must be specified during a query of the secondary index. For example, in the zip-code-partitioned index example, a query using the index must specify the zip code attribute, which is used by the storage engine to forward the query to a group of nodes managing the intended partition. This requirement makes the zip-code-partitioned index inconvenient to use for certain types of queries, for example, where the zip code is not a query condition.

Moreover, the user's initial choice of the partition key at the index's creation may not prove to be the best choice, given the actual distribution of data that is subsequently stored in the index. For example, a user may initially choose the zip code attribute as the partition key for the pizza order index. However, the data that is later inserted into in the index may include a large number of orders for a small handful of zip codes, resulting a set of partitions that is not balanced. Such unbalanced partitions largely nullify the benefit of partitioning in the first place. These issues with secondary indexes generally cause inconveniences for the user and reduces the usability and efficiency of these indexes.

Accordingly, in embodiments described herein, an auto-partitioning secondary index (APSI) for a table is disclosed. In some embodiments, when the APSI is created, the APSI automatically generates a partition key. Thus, the creation request for the APSI may not specify the partition key. However, in some embodiments, the creation request may specify one or more sort keys for the index, and/or one or more non-key attributes of the table, which are referred to as projected attributes. In some embodiments, sort key attributes and projected attributes are not required in queries or inserts to the index. In some embodiments, the partition key may be limited a set of partition key values, for example a numeric value in the rage from 0 to 9, which may correspond to an initial set of partitions used to store items in the APSI.

In some embodiments, when an item is inserted in the APSI, the insertion request does not specify the partition key. In some embodiments, the APSI may automatically assign a partition key to the item. In some embodiments, incoming items are assigned to the partitions in a round robin fashion, which may keep the partitions relatively balanced. In some embodiments, if one or more sort keys are specified for the APSI, the incoming items may be stored in its assigned partition at a location according to its sort key value.

In some embodiments, when a query is performed on the APSI, the query does not specify the partition key. In some embodiments, the APSI generates subqueries that are distributed to the APSI's partitions. The APSI may then aggregate the results from the subqueries in a single result set. In some embodiments, the query may specify a query condition based on a sort key of the APSI. In that case, during aggregation, the results from the subqueries may be returned in sorted order. The APSI may combine the sorted results from the partitions to create an aggregate result set that is globally sorted. In some embodiments, where the query includes a range filter on the sort key, the APSI may generate an aggregate result set for the query without performing a full scan of each partition.

In some embodiments, the APSI or storage system may observe certain usage or performance metrics associated with the APSI, and trigger a repartitioning of the APSI based on observed conditions. In some embodiments, APSI may be repartitioned by copying the items from the old APSI into a new APSI instance, which may include more or less partitions than the existing set of partitions. In some embodiments, the repartitioning may occur in the background, while the APSI continues to service requests using the old APSI instance and the existing set of partitions. When the repartitioning is complete, the APSI name may switch over to the new APSI instance and the new set of partitions.

Thus, according to embodiments disclosed herein, the APSI relieves the user from having to explicitly specify the partition key when working with the secondary index. In some embodiments, the APSI does not require the user to specify a partition key at the index's time of creation. This avoids the risk of creating an index that is not conveniently usable for certain types of queries and that generates unbalanced partitions when populated with actual data. In some embodiments, the APSI may assign key values such that the partitions stay relatively balanced over time. For example, some embodiments of the APSI may assign key values in a round robin or pseudorandom fashion. In rare situations where the partitions fall out of balance, for example due to a deletion of a large number of items, the partitions may be rebalanced via a repartition. In some embodiments, the APSI simplifies the query interface by eliminating the partition key constraint requirement in queries. In some embodiments, the APSI allows the user to use one or more index attributes as sort keys to facilitate later queries.

In this manner, embodiments of the APSI provide a key-partitioned index whose partitioning is independent from any actual attributes in the data set, and one that automatically generates relatively balanced partitions. The APSI does not require a partition key to be specified during the creation, querying, or updating of the index. These and other features and benefits of the inventive system and method are described in more detail below, in connections with the figures.

FIG. 1 is a block diagram illustrating an example computer system that implements an auto-partitioning secondary index, according to some embodiments. The computer system 100 may include clients 110a to 110n. These clients 110 may encompass any type of client configurable to submit services requests to a network-based storage service 130 via network 220. In some embodiments, the storage service 130 may not be a network-based storage service, but rather be accessed by a client 110 in the same computer. In some embodiments, a given client 110 may include a suitable version of a web browser or a plug-in module for a web browser, or other type of code module configured to execute as an extension to or within an execution environment to provide database or data storage service clients (e.g., client applications, users, and/or subscribers) access to the services provided by storage service 130. Alternatively, a client 110 may encompass an application such as a database application, media application, office application or any other application that may make use of persistent storage resources. In some embodiments, an application may include sufficient protocol support (e.g., for a suitable version of Hypertext Transfer Protocol (HTTP)) for generating and processing web services requests without necessarily implementing full browser support for all types of web-based data. A client 110 may be an application configured to interact directly with the storage service 130. In some embodiments, a client 110 may be configured to generate web service requests according to a Representational State Transfer (REST)-style web services architecture, a document- or message-based web services architecture, or another suitable web services architecture.

In some embodiments, client 110 may be configured to provide access to storage service 130 to other applications in a manner that is transparent to those applications. For example, a client 110 may be configured to integrate with an operating system or file system to provide storage in accordance with a suitable variant of the storage model described herein. In some embodiments, the operating system or file system may present a different storage interface to applications, such as a conventional file system hierarchy of files, directories and/or folders. In some embodiments, applications may not need to be modified to make use of the storage system service model described herein. Instead, the details of interfacing to storage service 130 may be coordinated by the client 110 and the operating system or file system on behalf of applications executing within the operating system environment.

As illustrated, the clients 110 may convey requests to and receive responses from the storage service 130 via a network 120. In various embodiments, network 120 may encompass any suitable combination of networking hardware and protocols necessary to establish network communications between clients 110 and storage service 130. For example, network 120 may encompass the various telecommunications networks and service providers that collectively implement the Internet. Network 120 may also include private networks such as local area networks (LANs) or wide area networks (WANs) as well as public or private wireless networks. For example, both a given client 110 and storage service 130 may be respectively provisioned within enterprises having their own internal networks. In such an embodiment, network 120 may include the hardware (e.g., modems, routers, switches, load balancers, proxy servers, etc.) and software (e.g., protocol stacks, accounting software, firewall/security software, etc.) necessary to establish a networking link between given client 110 and the Internet as well as between the Internet and storage service 130. In some embodiments, clients 110 may communicate with network-based storage service 130 using a private network rather than the public Internet. For example, a client 110 may be provisioned within the same enterprise as the storage service 130 and/or the underlying system described herein. In some embodiments, a client 110 may communicate with the storage service 130 entirely through a private network 120 (e.g., a LAN or WAN that may use Internet-based communication protocols but which is not publicly accessible).

In some embodiments, the storage service 130 may be configured to implement one or more service endpoints configured to receive and process service requests, such as requests to access tables maintained on behalf of clients/users by storage service 130, and/or the items and attributes stored in those tables. For example, storage service 130 may include hardware and/or software configured to implement various service endpoints and to properly receive and process HTTP-based web services requests directed to those endpoints. In one embodiment, storage service 130 may be implemented as a server system configured to receive web services requests from clients 110 and to forward them to various components that collectively implement a data storage system for processing. In some embodiments, storage service 130 may be configured as a number of distinct systems (e.g., in a cluster topology) implementing load balancing and other request management features configured to dynamically manage large-scale web services request processing loads.

As illustrated, the storage service 130 may include a dispatcher 140 (which may be configured to receive, authenticate, parse, throttle and/or dispatch service requests, among other things), one or more administrative components, or auto admin instances 150 (which may be configured to provide a variety of visibility and/or control functions, as described in more detail herein) which may be implemented as part of a frontend 132. Storage service 130 may also implement a plurality of storage node instances (e.g., nodes 172a-c, 176a-c, 180a-c), each of which may maintain and manage one or more tables and/or indexes on behalf of clients/users or on behalf of the storage service itself, as part of a backend 134. Some of the functionality provided by each of these types of components is described in more detail herein, according to various embodiments. Note that in some embodiments, storage service 130 may include different versions of some of the components illustrated in the figure to provide functionality for creating, accessing, and/or managing tables and/or indexes maintained in database instances within a single-tenant environment than those that provide functionality for creating, accessing, and/or managing tables and/or indexes maintained in database instances within a multi-tenant environment. In some embodiments, functionality to support both multi-tenant and single-tenant environments may be included in any or all of the components illustrated in the figure. In some embodiments, one or more database instances may be implemented on each of the storage nodes (e.g., 172a-c, 176a-c, 180a-c), and each may store tables and/or indexes on behalf of clients 110. Some of these database instances may operate as if they were in a multi-tenant environment, and others may operate as if they were in a single-tenant environment. In some embodiments, database instances that operate as in a multi-tenant environment may be implemented on different computing nodes (or on different virtual machines executing on a single computing node) than database instances that operate as in a single-tenant environment.

In various embodiments, the components illustrated in the figure may be implemented directly within computer hardware, as instructions directly or indirectly executable by computer hardware (e.g., a microprocessor or computer system), or using a combination of these techniques. For example, the components of the storage service 130 may be implemented by a distributed system including a number of computing nodes (or simply, nodes), such as computing systems described below. In some embodiments, the functionality of a given storage service system component may be implemented by a particular computing node or may be distributed across several computing nodes. In some embodiments, a given computing node may implement the functionality of more than one storage service system component.

In various embodiments, storage service 130 may be configured to support different types of service requests. For example, in some embodiments, storage service 130 may be configured to implement a particular web services application programming interface (API) that supports a variety of operations on tables or indexes, or other data objects, that are maintained and managed on behalf of clients/users by the data storage service system.

The APIs provided by the storage service 130 may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation, or JSON), or may be represented using a binary encoding (which, in some cases, may be more compact than a text-based representation). In various embodiments, the system may supply default values (e.g., system-wide, user-specific, or account-specific default values) for one or more of the input parameters of the APIs described herein.

In some embodiments, the control plane APIs supported by the storage service 130 may include APIs that perform updates on tables (e.g., a CreateTable API and/or a DeleteTable API). In various embodiments, these APIs may invoke asynchronous workflows to perform the requested operation. In addition, the service may support methods that return the current known state (e.g., a DescribeTables API) or that return various skew metrics or reports (e.g., an ExploreTable API). In some embodiments, a common use model may be for a client to request an action (e.g., using a CreateTable API), and then to poll on its completion via the corresponding description API (e.g., DescribeTables). Other supported methods may be used to modify table of index configurations or parameters, e.g., an UpdateTable API (which may be used to increase the provisioned throughput capacity for a given table), a PurchaseTableCapacity API (which may be used to increase the provisioned storage capacity for a given table or index), a SplitTable API (which may be used to explicitly invoke an operation to split a table or index or any of its partitions), or a MoveTable API (which may be used to explicitly invoke an operation to move one or more tables or indexes, partitions of a table, or partition replicas of a table).

In some embodiments, the storage service 130 may provide an application programming interface (API) that includes support for some or all of the following operations on data maintained in a table by the service on behalf of a storage service client: put (or store) an item, get (or retrieve) one or more items having a specified primary key or partition key, delete an item, update the attributes in a single item, query for items using an index, and scan (e.g., list items) over the whole table, optionally filtering the items returned. For example, the storage service 130 may provide various data plane APIs for performing item-level operations, such as a PutItem API, a GetItem (or GetItems) API, a DeleteItem API, and/or an UpdateItem API, as well as one or more index-based seek/traversal operations across multiple items in a table, such as a Query API and/or a Scan API.

In addition to functioning as an endpoint for clients' service requests, in some embodiments the storage service 130 may implement various client management features. For example, storage service 130 may coordinate the metering and accounting of client usage of services, including storage resources, by tracking the identities of requesting clients 110, the number and/or frequency of client requests, the size of tables and/or items stored or retrieved on behalf of clients 110, overall storage bandwidth used by clients 110, class of storage requested by clients 110, and/or any other measurable client usage parameter. The storage service 130 may also implement financial accounting and billing systems, or may maintain a database of usage data that may be queried and processed by external systems for reporting and billing of client usage activity. In some embodiments, the storage service 130 may include a lock manager and/or a bootstrap configuration (not shown).

In some embodiments, the storage service 130 may provide an application programming interface (API) that includes support for some or all of the following operations on the data in a table or index maintained by the service on behalf of a storage service client: put (or store) an item, get (or retrieve) one or more items having a specified primary key, delete an item, update the attributes in a single item, query for items using an index, scan (e.g., list items) over the whole table, and/or optionally filtering the items returned. In some embodiments, the API may also include support to create one or more secondary indexes global to a table which may be used to perform different queries efficiently over particular attributes in the table that are used to create the secondary index. In some embodiments, the secondary indexes may store the same logical items as the associated table, but stored differently. For example, items in the secondary indexes may be stored in a different sort order from the table (using a different sort key), or in a different set of partitions as the table (using a different partition key). As another example, items in the secondary indexes may include only a subset of attributes stored in the associated table. In some embodiments, inserts or deletes from the table may automatically trigger inserts or deletes in the indexes associated with the table.

In some embodiments, the API of the storage service 130 may provide support to create one or more auto-partitioning secondary indexes for a table. As discussed in further detail below, the APSI may create its own partition keys and manage its own partitions, without relying on any user attribute in the index. The APSI may be created with the table, or created by a separate operation after the creation of the table. In some embodiments, the API may also support an operation to describe the metadata of a table or an index. In some embodiments, the API may support, for an APSI, an explicit user operation to repartition the APSI.

In some embodiments, the storage service 130 and/or the underlying system that implements the service may support a strong consistency model, in addition to supporting eventually consistent read operations. In some embodiments, service requests made via the API may include an indication of one or more user preferences, such as a preferred consistency model, a preferred service request throughput level, or a service request throughput level for which a guarantee is requested. In other embodiments, some or all of these user preferences may be specified when a table is created, or may be client-specific, account-specific, specific to various table types, or specified by system-wide default values, rather than being specified on a per-request basis. The API may support extreme scaling and/or more predictable performance than that provided by prior data storage systems and services.

In some embodiments, a partition replica may be assigned to a particular storage node based largely (or solely) on whether there is enough storage capacity for the anticipated size of the table. For example, the anticipated size may be based on information included in a request to create the table or index, on usage history for the client on whose behalf the table or index was created, or on a history of accesses that target the table or index, the partition, or the replica itself (e.g., if this is a partition replica that is being reassigned as part of a move operation). In such embodiments, there may or may not be enough throughput capacity for the partition replica on the selected storage node (or storage device thereof). For example, a disk to which the partition replica is assigned may be oversubscribed in terms of IOPS, the actual number of TOPS may be more than was expected, or the provisioned (or committed) number of IOPS may have grown after the partition replica was created (e.g., using an UpdateTable operation to increase the provisioned throughput capacity for read operations and/or write operations). In some embodiments, an UpdateTable operation may be invoked by a client through a graphical user interface (GUI). In other embodiments, an UpdateTable operation may be invoked through an UpdateTable API whose inputs include an identifier of the table for which additional throughput capacity is desired, a desired (e.g., increased) number of IOPS for read operations and/or a desired (e.g., increased) number of TOPS for write operations. In some or all of these cases, the partition replica may need to be moved to another storage node (or storage device) or split into two new (smaller) partitions, each of which may be hosted on a different storage device (or storage node).

In some embodiments, the storage service 130 may be implemented on one or more computing nodes that are configured to perform the functionality described herein. In some embodiments, the service may be implemented by a network-based storage service that is made up of multiple computing nodes, each of which may perform one or more of the functions described herein. Various collections of the computing nodes may be configured to provide the functionality of an auto-admin 150 cluster, a cluster of resources dedicated to the storage service, and a collection of external resources (which may be shared with other network-based services or applications, in some embodiments).

In some embodiments, the storage service 130 may support seamless scaling of user tables or indexes in a "fully shared nothing" type architecture. For example, in some embodiments, each table or index partition (e.g., partitions 170, 174, and 178) may be implemented as a completely independent parallel computation unit. In such embodiments, the system may provide minimal distributed coordination across partitions or support batch "put" operations and/or multi-statement transactions. In some embodiments, as long as the workload distribution is well spread across partitions, an increase in the number of partitions may result in a larger usable table size and/or increased throughput capacity for service requests. As described herein, in some embodiments, live repartitioning (whether programmatic/ automatic or explicitly initiated) may be employed to adapt to workload changes. In other words, in some embodiments, repartitioning (including partition moving, partition splitting, and/or other partition management operations) may be performed while service requests directed to the affected partitions continue to be received and processed (i.e. without taking the source partition off-line).

In some embodiments, the storage service 130 and/or underlying system may support a variety of service offerings and/or throughput models. In some embodiments, the storage service 130 may support a committed work throughput offering and/or a best effort offering. In some embodiments, a committed work throughput level may be specified in terms of a measure of normalized, logical work units (or logical service request units) over time, and may represent a work throughput level that is guaranteed by the system. For example, for the storage service 130 (e.g., for particular tables or indexes maintained on behalf of clients), a client (e.g., a client application, user, or subscriber having access to the service) may specify a preference between multiple throughput options that are offered by the service, according to a variety of business models, subscription types, and/or payment models. For example, the client/user may indicate a preferred throughput model for a particular table or index through a parameter of a request to create the table or index, in some embodiments. In some embodiments, a client/user may specify a default throughput model for all tables or indexes created and maintained on their behalf by the storage service 130. By supporting both a committed throughput model and a best effort throughput model (for which no throughput guarantees are made), the storage service 130 may allow clients/users to make a trade-off between performance and cost, according to their needs and/or budgets. Other types of services may support a committed work throughput model and/or other throughput models.

The storage service 130 and/or underlying system that provides a committed throughput offering may be configured to pre-allocate capacity and/or resources for the creation, growth, and management of a table or index maintained on behalf of a client 110 in response to traffic directed to the table or index, and not to overbook the resources and/or capacity of the storage node(s) on which that table or index is maintained. In some embodiments, tables or indexes maintained by the storage service 130 and underlying system under a committed throughput model may be maintained in faster (and often more expensive) storage resources, such as high performance media (e.g., flash memory or Solid State Drive, or SSD, media), in order to provide extremely low latencies when servicing requests from the client 110. For example, the storage service 130 may provide or dedicate a high ratio of fast/local memory to main (e.g., disk) memory for the maintenance of those tables and various partitions thereof. In some embodiments, while the storage resources allocated to a given table or index under a committed throughput model may in some cases be underutilized (at least some of the time), the client 110 may value the predictable performance afforded by the committed throughput model more than the additional (and in some cases wasted) costs of dedicating more resources than may always be necessary for the table or index. Similarly, resources that are pre-allocated to other types of services to support a committed work throughput model may in some cases be underutilized (at least some of the time), but may provide the client 110 with a predictable level of performance (e.g., in terms of availability and/or responsiveness).

In some embodiments, the storage service 130 may include a dispatcher 140 as part of its frontend 132. The dispatcher 140 may include one or more modules implemented on one or more compute nodes. In some embodiments, the dispatcher may be implemented using a pool of compute instances, which may be virtual machine instances. The modules of the dispatcher 140 may be configured to perform a number of client interfacing functions, including parsing and/or throttling of service requests, authentication and/or metering of service requests, dispatching service requests, and/or maintaining a partition map cache. In some embodiments, the dispatcher 140 may maintain additional state in the partition map cache to aid in APSI partition management functions. For example, in some embodiments, the partition map cache may indicate a particular storage node of a particular partition as an APSI request handler 160 for an APSI. As a result, the dispatch 140 may forward query and update requests directed to that APSI to the particular storage node. In some embodiments, the partition map cache may maintain information concerning the current usage level of each partition of an APSI index. This information may be used by the APSI partition manager 155 to initiate a repartitioning of the APSI.

In some embodiments, the storage service 130 may include an auto administration subsystem 150. The auto admin 150 may include one or more modules implemented on one or more compute nodes. In some embodiments, the auto admin 150 may be implemented using a pool of compute instances, which may be virtual machine instances. The modules of the auto admin 150 may be configured to provide a variety of administration functionalities for the storage service 130, including for example visibility and control to system administrators, heat balancing, anomaly control, and/or resource allocation. The modules of the auto admin 150 may be configured to work separately or in combination to perform identifying requests for asynchronous processing and performing asynchronous processing of requests. An auto admin instance 150 may also include an admin console, through which system administrators may interact with the storage service 130 and/or the underlying system. In some embodiments, the admin console may be the primary point of visibility and control for the storage service 130 (e.g., for configuration or reconfiguration by system administrators). For example, admin console may be implemented as a relatively thin client that provides display and control functionally to system administrators and/or other privileged users, and through which system status indicators, metadata, and/or operating parameters may be observed and/or updated.

In some embodiments, the auto admin instance 150 may include a control plane task registry. The control plane task registry may provide an interface or access to information stored about one or more detected control plane events, such as requests to be processed, at storage service 130. In some embodiments, control plane task registry may be implemented to interface with a table or data object that can be changed, updated or written to by other modules of auto admin instance 150, such as a control plane task engine. For example, in some embodiments control plane event data may be stored on a database table that is accessible via control plane task registry. In at least some embodiments, other service systems, nodes, devices, instances, etc. may send registration messages for detected control plane events, updates, or some other form of request to auto admin instance 150 for storage in task registry.

In some embodiments, control plane event registration messages may include information about the detected control plane event. For example, control plane event messages may include the event trigger, such as a particular client or module. Information about the one or more control plane operations to be performed in response to the control plane event, such as the request type or the resources to be utilized (e.g., storage nodes) may be included.

In some embodiments, the auto admin instance 150 may include an APSI partition manager 155. The APSI partition manager 155 may be implemented as modules one or more compute nodes to carry out APSI partition management processes in the control plane. The APSI partition manager 155 may be a special node that is dedicated to serve as the authoritative APSI partition manager 155 node for an APSI. In other embodiments, the role of the APSI partition manager 160 may be rotated among a plurality auto admin nodes 150. In some embodiments, the APSI partition manager 155 role may rotate from node to node, periodically, based on a rotation protocol. The rotation protocol may be based on a number of runtime factors, such as the load and capabilities of the nodes. In some embodiments, a group of nodes may serve as the APSI partition manager 155 simultaneously.

In some embodiments, the storage service 130 may include one or more storage nodes in the backend 134. The storage nodes, which may include storage 172a-c, 176a-c, and 180a-c, may include one or more modules implemented on one or more compute nodes. In some embodiments, the storage nodes may be implemented using a pool of compute instances, which may be virtual machine instances. The modules of the storage nodes may be configured to perform a storage functions such as the handling of storage requests, partition management, and/or replication and failover processes. In some embodiments, a storage node instance may include a storage engine, which may be configured to maintain (i.e. to store and manage) one or more tables or indexes in storage via storage API. In some embodiments, the storage may be a non-relational database. In some embodiments, the storage node may be configured to handle queries and updates directed to APSI indexes. For example, in some embodiments, the APSI request handler 160 may be implemented as one or more storage nodes. The storage nodes may insert items in the APSI so that the partitions remain relatively balanced. In some embodiments, a large update to the APSI may place the APSI partitions out of balance, and cause the APSI request handler 160 to generate a repartition request to the APSI partition manager 155.

In some embodiments, the APSI request handler 160 may possess knowledge of the partition key of the APSI and the possible key values, and use the key values (e.g., key values 190, 194, and 198) to identify respective APSI partitions (e.g., partitions 170, 174, and 178). In some embodiments, each partition of the APSI may be associated with a separate partition key, which may be automatically assigned during the creation of the APSI. In some embodiments, the set of key values of the APSI comprise a set of numerical values, for examples integers 0 to 9, corresponding to ten different APSI partitions.

Although use of the APSI's partition key does not need to be specified in a request directed to the APSI, in some embodiments, the APSI's partition key may be obtained via a query and specified in a subsequent update. For example, the APSI hint may be an opaque token that was generated by a previous query and sent to the client as part of the query result. The opaque token may include information that identify the partitions that contain items satisfying the query. In some embodiments, the APSI hint may specify the partition key of the items in the query result. If the client specifies the APSI hint in a subsequent update and the APSI instance ID in the APSI hint is still valid (APSI has not been repartitioned), then the APSI hint allows the service to optimize application of the update operation; sub-updates need only be sent to the partitions which contain the items to be updated. If the APSI hint is not included in the update, then the request may be distributed to all partitions because any one of them could contain the item to be updated.

In some embodiments, each APSI partitions 170, 174, and 178 may be hosted or maintained by a different group of storage nodes. For example, as shown, APSI partition 170 is hosted by a group of storage nodes 172a-c, APSI partition 174 is hosted by storage nodes 176a-c, and APSI partition 178 is hosted by storage nodes 180a-c. In some embodiments, the group of storage nodes hosting an APSI partition may form a replica group, in which each storage node maintains a replica of the data of the partition. In some embodiments, a replica group may include one or more master replica nodes, such as master replica node 172a in the APSI partition 170. The master replica node 172a may be elected and rotated from time to time to perform certain coordination work during the servicing of requests directed to that replica group. For example, in some embodiments, the master replica 172a may be the primary handler of all write requests to the partition to enforce a durability requirement. In some embodiments, a write is deemed durable when a certain number of replica nodes in the replica group acknowledge the write. In some embodiments, each replica group may operate as a largely independently unit of storage that is capable of handling all routine reads and writes to its partition without relying on any other replica groups. It may be appreciated that in such a scheme, it is desirable to distribute data among the partitions and/or replica groups such that the respective storage and workloads of the replica groups are distributed evenly.

In some embodiments, the APSI partition manager 155 may be responsible for initially creating the APSI. In some embodiments, the APSI creation functionality may be carried out by a component in the frontend 132, for example, an auto admin instance 150. In some embodiments, the APSI partition manager 155 may be a special auto admin instance that is dedicated to serve as the creator of APSIs. The APSI may be created in response to a creation request from the client 110. In some cases, the creation request may be part of a request to create a table in the storage service 130. In other cases, the creation request may be a request to add an APSI for an existing table.

In some embodiments, the APSI creation request may not specify a partition key for the APSI. Rather, the APSI partition manager 155 may automatically generate a partition key attribute for the APSI. The generated partition key may not be or based on an attribute that is previously defined in the table associated with the APSI. In response to the APSI creation request, the APSI partition manager 155 may determine a number of partitions to allocate for the APSI, and generate partition key values for the partitions. The set of partition key values of the APSI may comprise a set of numerical values, for examples integers 0 to 9.

In some embodiments, the APSI creation request may specify one or more sort key conditions based on sort keys. A sort key condition may constrain the query to a particular sort key value or a range of sort key values. Items may be stored in the APSI partitions in a sort order based on the sort keys. A query that specifies the sort key condition may be handled more quickly, since a search for items in the partition based on the sort key does not require a full scan of the entire partition.

In some embodiments, the APSI partition manager 155 may create the partitions. In some embodiments, the APSI partition manager 160 may allocate the storage for each of the partitions. The allocation may be performed using other components in the control plane, which may be implemented by one or more auto admin instances 150. The storage for a partition may be allocated for an initiate amount of storage, and scaled up to a maximum size based on actual usage. In some embodiments, a partition may be scaled down based on the level of actual usage. In some embodiments, the APSI partition manager 155 may provision compute instances to operate as the replica group for the APSI partitions. For example, the APSI partition manager 160 may launch the storage nodes 172a-c, which may be loaded with storage node software capable of maintaining an APSI partition. In some embodiments, the storage nodes may be virtual machine instances operating on one or more physical hosts. In some cases, the provisioned storage nodes may form a replica group, and elect a master replica to coordinate the replica group.

In some embodiments, the APSI creation request may specify certain additional parameters for the APSI. Some of the parameters may be optional. For example, in some embodiments the creation request may specify the initial number of partitions for the APSI. The creation request may also specify the minimum and/or maximum number of partitions for the APSI. In some embodiments, the creation request may specify the triggering conditions for repartitions of the APSI. The triggering conditions may be provided as parameters to the creation request, or in some embodiments, as a configuration file containing schema information for the APSI. In some embodiments, the client 110 may specify that the APSI will repartition if the number of items or the relative sizes of the partitions fall out of balance by a specified threshold. In some embodiments, the APSI may be set to repartition when the number of items, size, or load of one or more partitions exceeds a threshold. In some embodiments, the subrequest latencies of the partitions may be observed, and a partition that exhibits a much longer latency (in processing requests) than the rest may indicate a need to repartition. In some embodiments, the APSI may repartition when the overall number of items, size, or load of the APSI exceeds a threshold. Other repartition conditions may be specified via the creation request, or via one or more later requests to modify the APSI schema.

In some embodiments, if an associated table already exists for the APSI, the APSI partition manager 155 may replicate the items in the table to the newly created APSI. In some embodiments, the APSI partition manager 155 may perform the replication in conjunction the APSI request handler 160, which may be responsible for the basic functionality of inserting and/or updating items in or to the APSI. The APSI partition manager 155 and/or APSI request handler 160, may iterate over all items in the table, format each item in accordance with the APSI schema, and then insert the item into the APSI. During the formatting process, the APSI partition manager 155 and/or APSI request handler 160 may assign to the item a partition key value corresponding to one of the allocated partitions of the APSI. The assignment may occur in a way such that the number of items and/or the size of data assigned to each partition stay relatively balanced. The APSI partition manager 155 and/or APSI request handler 160 may then forward the formatted item for storage to the assigned APSI partition and/or replication group, based on the partition key value.

In some embodiments, the APSI request handler 160 may be responsible for handling query and update requests to the APSI. In some embodiments, the APSI request handler 160 may receive query requests from the dispatcher 140. In some embodiments, the dispatcher 140 may maintain some knowledge that a storage node in the backend 134 is the APSI request handler 160 for a particular APSI, and forward all query and update requests to that storage node. In some embodiments, the dispatcher 140 may simply forward the query or update request to any storage node associated with the APSI. For example, in some embodiments, the query or update request may not specify a partition key. The dispatcher 140 may determine that the request is directed to an APSI, and simply select a random or predetermined storage node and/or partition as the handling storage node and/or partition.

In some embodiments, the APSI request handler 160 may handle a received query by issuing a plurality of subqueries to each of the APSI partitions (e.g., partitions 170, 174, and 178). Each partition 170, 174, and 178 may then return a set of query results for the respective subqueries to the APSI request handler 160, and the APSI request handler 160 may perform some additional work to aggregate the results, which is then returned to the query client.

In some embodiments, the APSI request handler 160 may handle a received insert or update request from the dispatcher 140. In some embodiments, an insert or update request to the APSI may be triggered by an insert or update to the table associated with the APSI. To handle an insert of an item to the APSI, the APSI request handler 160 may automatically assign a partition key value to that item. The assignment of the key value may be based on a policy that strives to keep the APSI partitions relatively balanced. For example, the APSI request handler 160 may assign key values to incoming items in a round robin fashion. To handle an update of an item in the APSI, in some embodiments, APSI request handler 160 may send the update request to each partition to apply the update to each partition in parallel. In some embodiments, the update may be received with an APSI hint that was passed to the client as the result of a previous query. The APSI hint may specify partitions that contain items satisfying the previous query. When an update is received with an APSI hint, the APSI request hander 160 may perform an optimization by sending updates to only the partitions specified in the APSI hint, instead of all partitions of the APSI.

In some embodiments, the APSI partition manager 160 may be responsible for initiating and/or performing a repartition of the APSI. For example, in some embodiments the APSI partition manager 155 may monitor for conditions and/or events that may cause a repartitioning of an APSI. For example, a heat balancing module may monitor the accesses to the different partitions of an APSI, and determine whether a hotspot exists in one of the partitions. If so, the heat balancing module may generate a control plane event to repartition the APSI. In some embodiments, a repartitioning may be triggered by the relative size or item counts of the partitions of the APSI. The repartition event may be placed on the control plane task registry, which may cause a repartition operation to be performed by the auto admin instance 150. In some embodiments, a repartition may be triggered by the APSI request handler 160, based on the accesses that are received by the APSI request handler 160. In some embodiments, a repartition may be triggered by an explicit request from the client 110.

The APSI partition manager 155 may perform the repartition, which may involve the creation of a new APSI. In some embodiments, the APSI partition manager 155 may create the new APSI instance such that the number of APSI partitions is increased. In some embodiments, the APSI partition manager 155 may create the new APSI such that the number of APSI partitions is decreased. A decrease of partitions may occur, for example, when the number of items in one or more APSI partitions in the old APSI instance fall below a certain threshold, and the APSI partition manager 155 determines that the APSI may be scaled down.

In some embodiments, in a repartitioning, the APSI partition manager 155 may create new partitions from scratch. For example, the APSI partition manager 155 allocate new storage for a new partition, and provision new storage nodes to form a new replica group for the new partition. In some embodiments, APSI partition manager 155 may launch a new APSI instance using the new partitions and the new storage nodes. In some embodiments, the APSI partition manager 155 may use the APSI request handler 160 to iteratively copy over items in an old partition of the old APSI instance to the new partitions in the new APSI instance. The copying may include assigning a new partition key value to each of the items in the old partition. The APSI partition manager 155 and/or the APSI request handler 160 may perform the assigning in a way that achieves balance in the new partitions.

In some embodiments, the APSI partition manager 155 and/or APSI request handler 160 may perform the repartitioning process in the background, without taking the existing partitions of the current APSI instance offline. Thus, the APSI being repartitions remain accessible to the clients 110 during the repartitioning process. When the repartitioning process is complete, the APSI partition manager 155 and/or APSI request handler 160 may cause metadata in the storage service 130 to be updated, so that the APSI is updated to refer to the new partitions. For example, the APSI name in the storage service may cut over to the new APSI instance. Some of the resources for the old partitions and the old APSI instance may then be deallocated and/or de-provisioned. In the event that updates to the APSI are received during the repartitioning process, the APSI request handler 160 may update the old APSI partitions as usual. However, APSI request handler 160 may also keep track of the updated items, so that they are also reflected new partitions of the new APSI instance.

In some embodiments, the repartitioning may cause an alert or notification to be sent to an account management system associated with the storage service, indicating that a repartition has occurred. The notification may indicate the new number of partitions associated with the APSI. In some embodiments, the storage service 130 may provide to the clients 110 a cost model for use of the APSI that is dependent on the number of partitions of the APSI. For example, in some embodiments, a query to an APSI with eight partitions may cost more than a query to an APSI with four partitions. Thus, the client 110 may wish to be kept informed about any repartitioning that occurs, via the account management system, which may impact the costs of using the storage service 130.

Figure 2A:
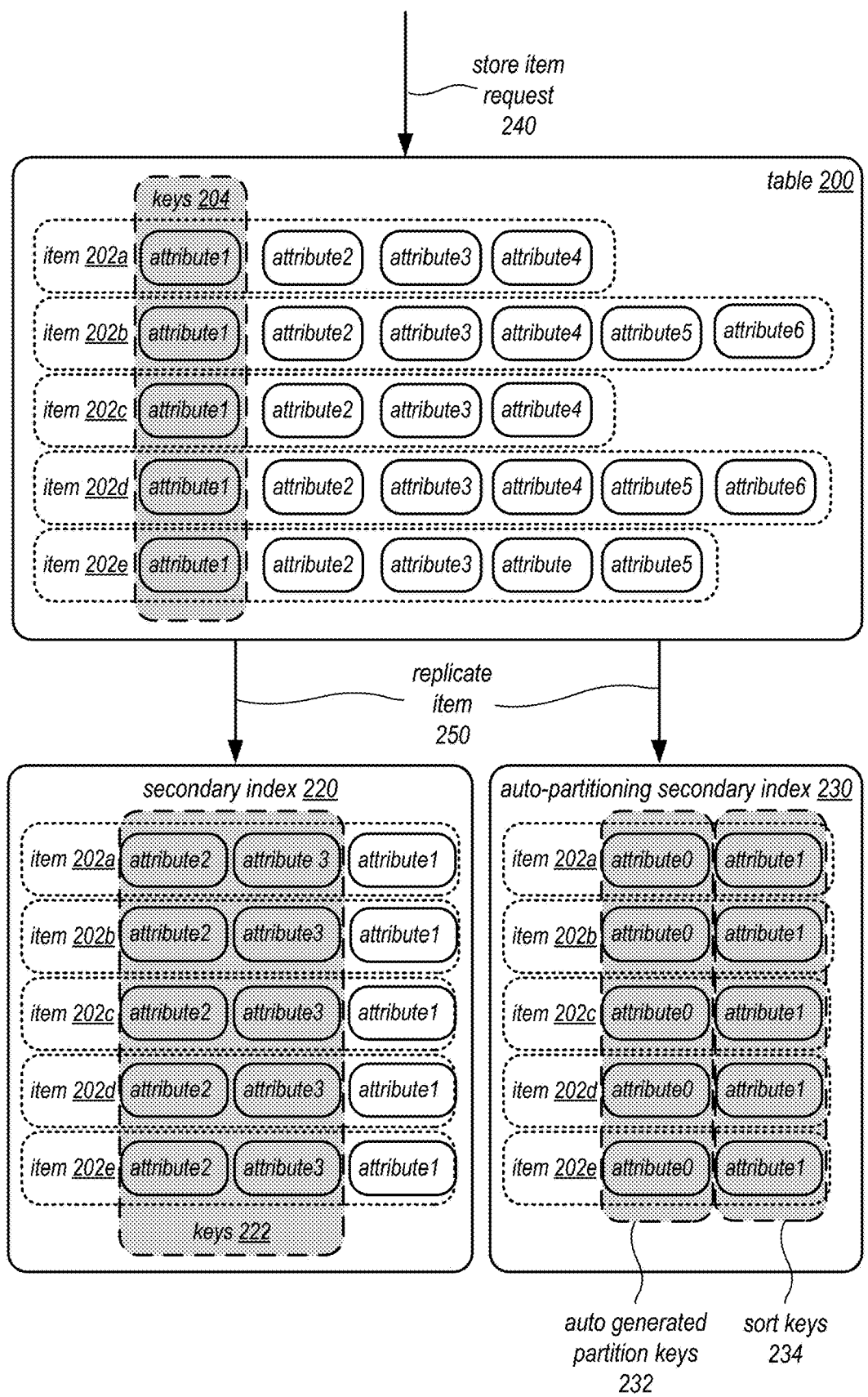
FIGS. 2A and 2B are a logical block diagrams illustrating exemplary keys that are used in a computer system that implements an auto-partitioning secondary index, according to some embodiments.

FIG. 2A a logical block diagram illustrating exemplary keys that are used in a computer system that implements an auto-partitioning secondary index, according to some embodiments. In some embodiments, the storage service 130 may store data on behalf of clients 110 in tables or indexes containing items that have one or more attributes. In some embodiments, the storage service 130 may present clients 110 with a data model in which each table and index maintained on behalf of a client 110 contains one or more items, and each item includes a collection of attributes. The attributes of an item may be a collection of name-value pairs, in any order. In some embodiments, each attribute in an item may have a name, a type, and a value. Some attributes may be single valued, such that the attribute name is mapped to a single value, while others may be multi-value, such that the attribute name is mapped to two or more values. In some embodiments, the name of an attribute may always be a string, but its value may be a string, number, string set, or number set. The following are all examples of attributes: "ImageID"=1, "Title"="flower", "Tags"={"flower", "jasmine", "white"}, "Ratings"={3, 4, 2}. The items may be managed by assigning each item a primary key value (which may include one or more attribute values), and this primary key value may also be used to uniquely identify the item. In some embodiments, a large number of attributes may be defined across the items in a table or index, but each item may contain a sparse set of these attributes (with the particular attributes specified for one item being unrelated to the attributes of another item in the same table or index), and all of the attributes may be optional except for the primary key attribute(s). Unlike in relational databases, the tables and indexes maintained by the storage service 130 may have no pre-defined schema other than their reliance on the primary key. In some embodiments, if an attribute is included in an item, its value cannot be null or empty (e.g., attribute names and values cannot be empty strings), and, and within a single item, the names of its attributes may be unique. However, in some other embodiments, traditional database schemas may be employed, such as the various types of relational databases implemented using Structured Query Language (SQL).

As shown, an exemplary table 200 is stored, containing items 202*a-e*. The items 202*a-e* may include different attributes. The set of attributes may be different from item to item. In some embodiments, there may be no imposed schema on attributes, excepting a primary key attribute 204 which may uniquely identify an item 202*a-e*). The attributes of the items may have different configurations (e.g., different date types, such as number or string). In some embodiments, the table 200 may be a key-partitioned table whose items are stored in different partitions, according to a partition key of the item. In some embodiments, the partition key may include the primary key 204.

A secondary index, such as secondary indexes 220 and 230, may be created when a table is created, or later after a table already exists. The creation of a secondary index when a table already exists may be performed while the table is still online, continuing to service access requests to items in the table. A configuration of the secondary index may be specified at the time of table creation. Additionally, the configuration may be changed after the secondary index exists (altering the behavior of subsequent attempts to update the secondary index). For example, for an APSI 230, the number of partitions may be changed by client request after the APSI's creation. In some embodiments, a secondary index that is not an auto-partitioning index may be converted to an APSI after creation. In such a conversion, a module such as the APSI partition manager 155 may copy all items in the non-auto-partitioning index into a newly allocated APSI, while assigning partition key values to the items.

Secondary indexes are created according to a different indexing schema than the indexing schema of the table. For instance, a table 200 may utilize attribute 1 (which is common to all items 202) as the key attribute for indexing table 200, whereas attributes 2 and 3 and used as the keys 222 for the secondary index 220. In some embodiments, to be eligible to be included in the secondary index 220, an item may have to have the same attributes as the key attributes identified for the secondary index by the indexing scheme for the secondary index. In secondary index 220, attributes 2 and 3 are used as the keys 222, so all items 102*a* through 102*e* are eligible.

In contrast, in an APSI 230, the items are keyed using an auto generated key 232, which may be added to the items 202 as an extra attribute 0. Because all items 202 in the table 200 are automatically assigned an auto generated key 232, all items in the table 200 are replicated in APSI 230. In some embodiments, the auto generated key 232 may be the partition key for the items 202, and is thus used to determine the partition for the item, as discussed above. Since the partition key 232 is not an actual data attribute of the item, it can be freely manipulated by the storage service 130 to keep the APSI partitions completely balanced. The auto generation of the partition key also relieves the user from having to specify the partition key in queries to the table 200.

In some embodiments, the APSI 230 may also include one or more sort keys 234. In some embodiments, unlike the partition key 232, the sort key 234 may not be required in a request to create, query, or update the index. In some embodiments, the sort key 234 may dictate a sort order in which items in a partition are stored. Thus, a query specifies that a query condition using the sort key may be able to take advantage of the sort key to generate query results more quickly. For example, if a query requests from a pizza order index all orders received between 2:00 and 3:00, where the order time is a sort key for the pizza order index, the index may fetch the items matching the order time criteria without having to scan the entire index partition. Moreover, in some embodiments, because the items are stored in sorted order, they may be quickly fetched and returned in sorted order.

In some embodiments, items may be added to a secondary index 220 or 230 as a result of different operations performed at table 200. For example, a request 240 to store an item in table 200 may be received by the storage service 130. In response to the storing of the new item in the table 200, operations 250 may be generated to replicate a corresponding item in each of the secondary indexes 220 and 230. The replication operation 250 may be performed by an index replicator that updates the secondary indexes 220 and 230 as a result of storing a new item or changing an attribute value of an item in the table 200. The index replicator may direct the replication of index updates to different secondary indexes. In some embodiments, index replicator may manage a number of outbound queues, which are specific to the secondary indexes receiving the update (e.g., respective queues for indexes 220 and 230). In this manner, secondary index updates may be performed at controlled rates so as not to overwhelm the secondary indexes. As discussed, the secondary indexes 220 and 230 may store the items differently from the table 200, for example in a different sort order or partition scheme, such that certain queries are more easily performed using the secondary indexes 220 or 230.

Figure 2B:
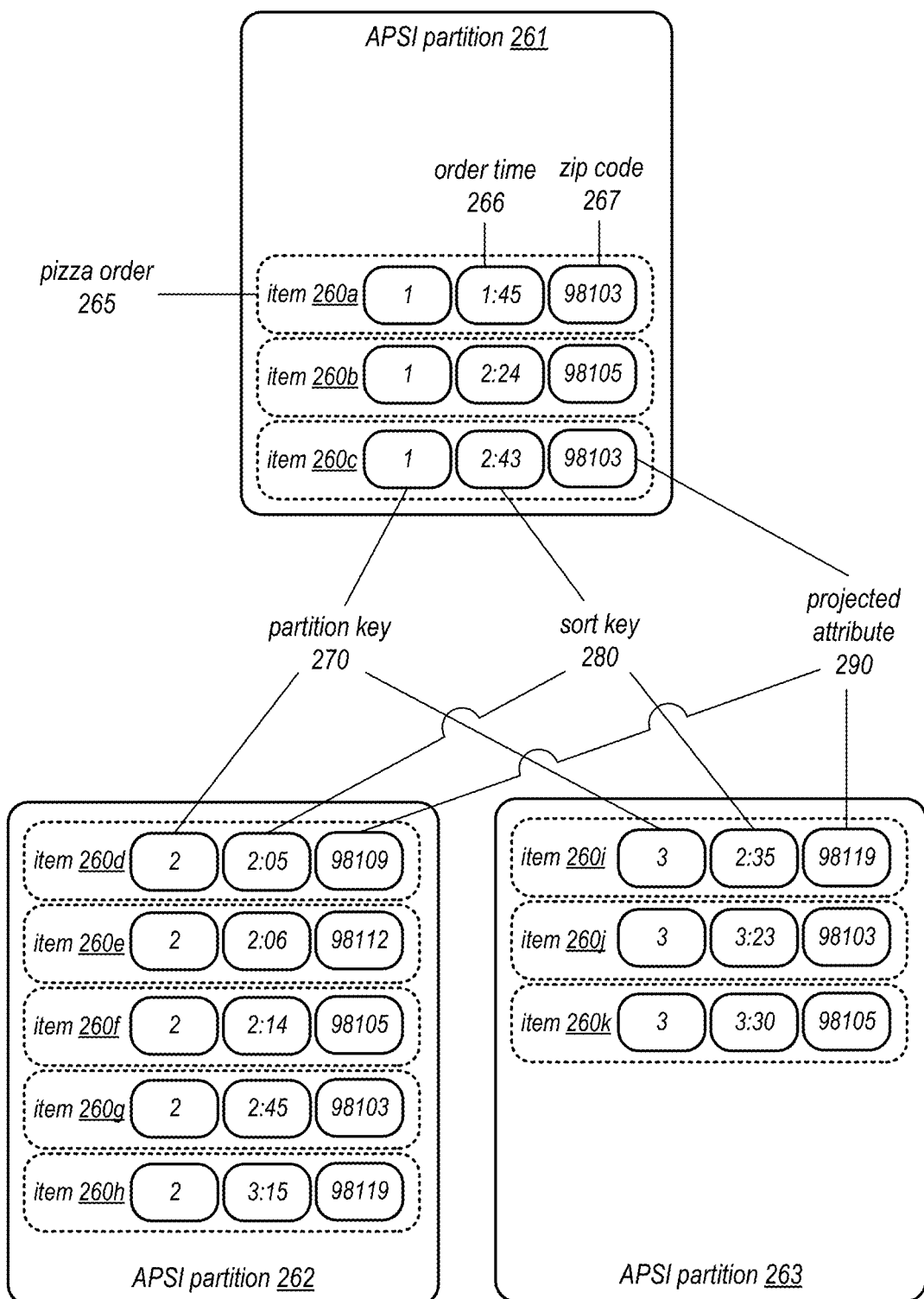

FIG. 2B is another a logical block diagram illustrating exemplary keys that are used in a computer system that implements an auto-partitioning secondary index, according to some embodiments. FIG. 2B illustrates an APSI that stores items for pizza orders 265. Each pizza order may have an order time attribute 266 and a zip code attribute 267. Three exemplary partitions 261, 262, and 263 may be allocated for an APSI. As illustrated, the APSI may be specified to have a partition key 270, a sort key 280, and one or more projected attributes 290. In some embodiments, the items may have a variable number of attributes.

As illustrated, attribute 270 may be a partition key attribute that dictates which partition each item is stored in. Thus, all items 260*a-c* that have partition key value 1 are stored in partition 261, all items 260*d-h* that have partition key value 2 are stored in partition 262, and all items 260*i-k* that have partition key value 3 are stored in partition 263. As discussed, in some embodiments, the partition key may be an attribute that is not specified in the creation request for the APSI, and automatically generated. In some embodiments, the partition key values for the partition key 270 are also automatically generated when items are inserted into the APSI, for example in a round robin fashion.

As illustrated, the APSI may also specify a sort key attribute 280. In some embodiments, a sort key condition need not always be specified in a request to create, query, or update an index. In some embodiments, not all items in the APSI may have a value for the sort key. Those items that are missing a sort key value will be sorted using the NULL value for the sort key. As discussed, in some embodiments, the items may be stored in the individual partitions in sort order according to the sort key. For example, the sort key 280 may be a time value that corresponds to an order time attribute 266 in a pizza order item. As shown, within partition 261, items 260*a-c* are stored in sort order based on the sort key 280. The same sorting is seen in partitions 262 and 263, as illustrated. The sorting facilitates queries that specify the sort key as a query condition. For example, in a range query that queries for all pizza orders with order times between 2:00 and 3:00, the sorting allows the query engine to fetch and return the results quickly, without scanning the entirety of the partitions.

As illustrated, the APSI may also specify one or more projected attributes 290, which in some embodiments are copied from the table associated with index. In some embodiments, as the table is updated, corresponding values in the APSI also changes, including for example the sort key 280 and any projected attributes 290. As illustrated, the projected attributes are non-key attributes in the APSI, and may be any type of data, such as for example a zip code 267 associated with a pizza order.

Figure 3:
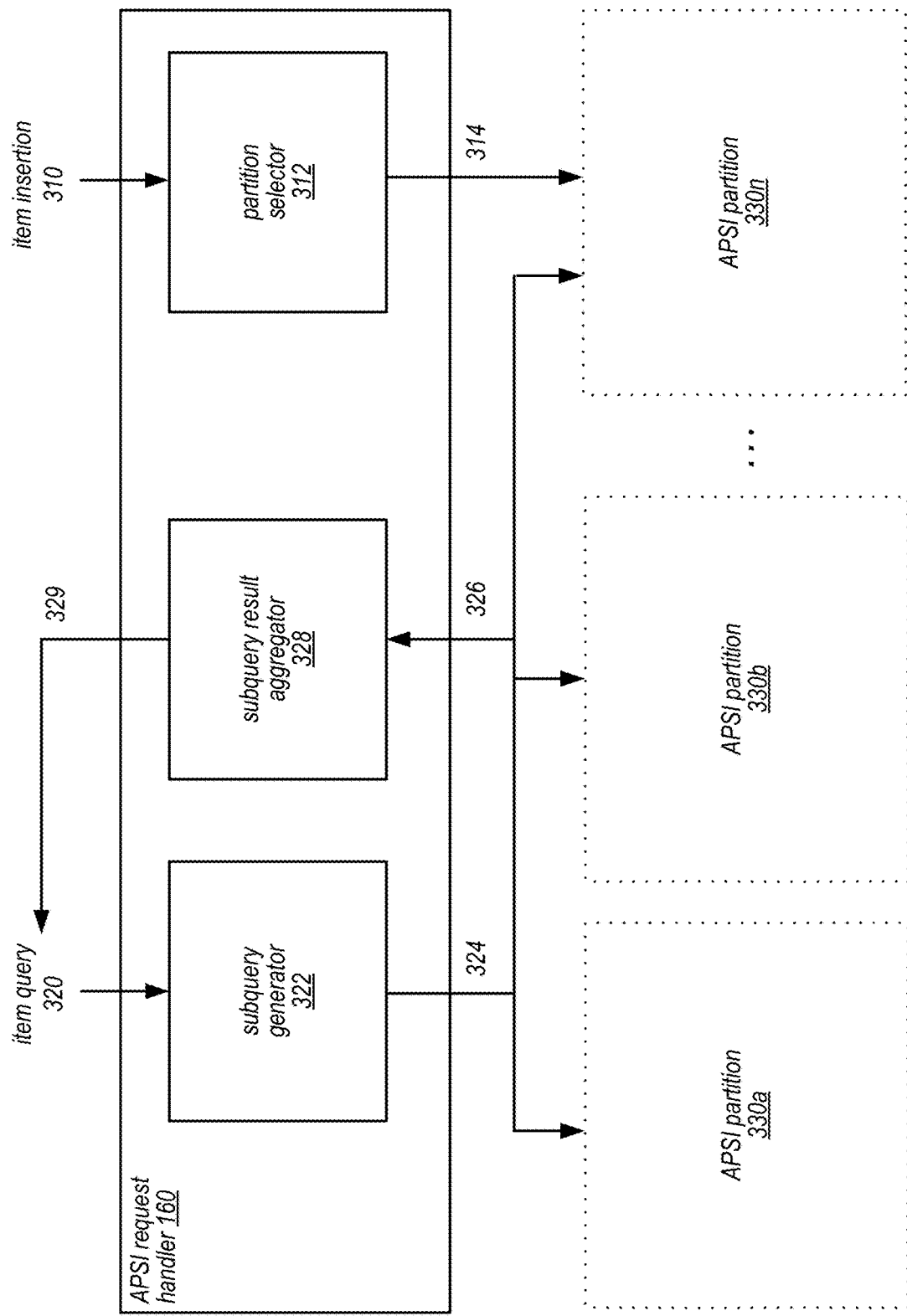
FIG. 3 is a block diagram illustrating components of a computer system that supports querying using an auto-partitioning secondary index, according to some embodiments.

FIG. 3 a block diagram illustrating components of a computer system that supports querying using an auto-partitioning secondary index, according to some embodiments. As illustrated, the APSI request handler 160, as discussed in connection with FIG. 1, may implement a number of modules to handle service requests for the storage service 130. The modules illustrated herein are merely exemplary. In some embodiments, some of the modules shown may be implemented together in a single module, in a plurality of separate modules, or in a different location in the storage service 130.

In some embodiments, the APSI request handler 160 may implement a partition selector 312. The partition selection 312 may be used during the servicing of an item insertion request 310. For example, in some embodiments, an item insertion request 310 may not specify a partition key for the new item. Accordingly, the partition selector 312 may be called upon to assign a new partition key value to the new item. The new item is then stored 314 in the appropriate partition, for example partition 330*n*. As discussed, this partition key dictates the APSI partition 330 that the item will be stored in.

The partition selector 312 may employ a number of different algorithms to assign the partition key value. In some embodiments, the partition selector 312 may assign the partition key in a pseudorandom fashion. In some embodiments, the partition selector 312 may assign the partition key in a round robin fashion, cycling through each of the partitions 330.

In some embodiments, the partition selector 312 may base the assignment as least in part on one or more attributes of the item. For example, a partition selector 312 may use a hash of a zip code attribute in the items in the assignment process. Such use of an attribute may be used to ensure that items are even distributed across the partitions with respect to that attribute, so that certain expected queries will not generate a hotspot in the APSI. In some embodiments, the partition selector 312 may base the partition key on a timestamp. For example, the timestamp may be used to ensure that bursts of insertions that are received within a short period of time are stored together in the same partition. This strategy may be used in particular cases, for example, when it is expected that the burst of insertions will be accessed later together in sorted order. Storing these items together on a single partition may allow for more efficient fetching of these items in the future.

In some embodiments, the partition selector 312 may be capable of using all of the assignment algorithms described above, individually or in combination. In some embodiments, the behavior of the partition selector 312 may be configurable. In some embodiments, the configuration may be provided by a client 110 as part of the APSI's schema information. In some embodiments, the configuration information may be adaptively adjusted by the storage service 130, depending on the operating conditions of the APSI. Aside from the item insertion operation 310, the functionality of the partition selector 312 may be used in other operations. For example, in some embodiments the partition selector 312 may be invoked during the creation of the APSI to for example replicate existing items in an associated table into the APSI.

In some embodiments, the incoming items may be stored at a location in the selected partition 330 based on its sort key value. In some embodiments, the APSI may be created with a sort key value, such that all items are stored in sort order according to each item's sort key value. By storing the items in sort order in the partitions 330, the APSI is optimized for queries that specify query conditions based on the sort key.

In some embodiments, the APSI request handler 160 may implement a subquery generator 322 and/or a subquery result aggregator 328. The subquery generator 322 and subquery result aggregator 328 may be used in combination to service an item query request 320 that is directed to the APSI. For example, in some cases, the item query request 320 may not specify a partition key value of the APSI. The item query request 320 may specify query conditions based on a sort key of the APSI, for example in a range query. Queries that filter on the sort key may be processed more quickly, as the items are stored in sorted order in the partitions 330.

In some embodiments, the APSI request handler 160 may determine that the query is potentially directed to all partitions 330 of the APSI. In some embodiments, the APSI request handler 160 may determine that the query is only directed to one or a subset of the partitions 330. For example, in some cases, the query may specify a particular attribute value as a filter condition. If the partition selector 312 used the particular attribute to assign items to the partitions (for example by hashing the attribute value), the APSI request handler 160 may determine that only one or a subset of partitions can possibly contain items satisfying the query. In that case, the APSI request handler 160 may perform an optimization by limiting the subqueries to only the subset of partitions.

In some embodiments, the APSI request handler 160 may instruct the subquery generator 322 to generate subqueries to the APSI partitions 330*a-n*. In some embodiments, the subquery generator may forward 324 the subquery to each of the partitions 330. In some embodiments, each partition 330 is managed independently by a replica group, which is able to handle the subqueries independently. The subquery generator 322 may send out 324 the subqueries serially, in parallel, or in staggered batches. Once the subqueries are issued, the subquery generator 322 may wait for the results from the partitions 330, and provide the results to the subquery result aggregator 328 for aggregation work. In some embodiments, the subquery generator 322 may recognize that for some types of queries, no additional aggregation work is required. In that case, the subquery generator 322 may simply return the results from each of the subqueries immediately as they are received.

In some embodiments, the subquery result aggregator 328 may perform functions to aggregate the query results received 326 from each partition 330a-n before the results are returned to the client. For example, in some embodiments, the query may specify a sort order. Accordingly, the subquery result aggregator 328 may take the results from each of the partitions 330, and place the results in a global sort order. In some embodiments, the APSI may store items in its partitions 330 according to a sort order based on a specified sort key. In some embodiments, this sorting enables optimized results fetching for queries that specify a sort key condition. When this occurs, sub-results from each partition may be returned to the subquery result aggregator 328 without having to scan each partition entirely.

For example, returning to FIG. 2B, FIG. 2B illustrates three partitions of an APSI that maintains a sort key 280, which may be an order time attribute for a pizza order index. When a query specifying the sort key 280 is received, the APSI query generator 322 may issue subqueries to each of the three partitions 261-263. For example, a query may include a condition that only items with order times between 2:00 and 3:00 be returned. Because the partitions 261-263 store the items in order based on the sort key 280, the sub-results may be returned very quickly, since the storage nodes for each partition may seek to the first item with an order time satisfying the condition, fetch all subsequent items satisfying the condition, and stop fetching as soon as an item not satisfying the condition is encountered.

In some embodiments, the partitions 261-263 may return the sub-results in pages. In that case, the subquery result aggregator 328 may wait for all paged results to be gathered, and then perform a sort of the paged sub-results into a sorted aggregate result set. However, it may not be possible to return a globally sorted result set until all pages from the partitions are seen. Thus, a query to an APSI asking a globally sorted result set may not return until all pages from the partitions are processed by the subquery result aggregator 328.

In some embodiments, a query may specify that the subquery result aggregator 328 should not wait to process all partition result pages before returning results. For example, in some cases, a client may not care to receive the results in full sort order, but only that some results are received immediately, for example to populate a GUI. In that case, the APSI request handler 160 may allow the client to specify in the query, via an option, that query results should be returned unsorted. The query may still specify a sort condition, for example a range filter, but at the same time, the query may specify that the APSI request handler 160 should not perform a global sort. When this option is provided in the query, the subquery result aggregator 328 may return a page of query results as soon as it is received from a partition 330, without waiting for all pages from all partitions to perform a global sort.

In some embodiments, the subquery result aggregator 328 may perform additional tasks, such as additional filtering of the sub-results. For example, in the case that a query searches for the three latest pizza orders according to the order time attribute, the partitions 261-263 may each return its top three orders. The subquery results aggregator 328 may take the three partition's top three results, and obtain the top three results from those sub-results. In some embodiments, the subquery results aggregator 328 may sort the sub-results into a sorted results set, and select the top three results from the sorted results set.

In some embodiments, the storage service 130 may support more complex aggregation functions, such as "sum" functions or "group by" functions. For example, to aggregate query results, the subquery result aggregator 328 may be programmed with logic to support these aggregation functions across all partitions 330. For example, to implement a "sum" function, the subquery result aggregator 328 may perform a global sum of all sub-sums provided by the partitions 330.

In some embodiments, the result sets from the partitions 330 may be received by the subquery result aggregator 328 as handle objects, so that the subquery result aggregator 328 does not need to copy the result sets into its own memory. In some embodiments where the subquery generator 322 and subquery result aggregator 328 are implemented as two separate threads or processes, the returned results sets from the partitions 330 may be tagged with a parent query identifier to indicate the parent query that a sub-result is associated with. In some embodiments, the subquery result aggregator 328 may wait for all sub-results to come back before initiating any aggregation work. In some embodiments, if one partition fails to respond with a sub-result, the subquery result aggregator 328 may indicate a failure for the item query request 320.

In some embodiments, the functionality of the subquery generator 322 and subquery result aggregator 328 may also be used in other operations, for example update or delete operations. For example, in response to an update or delete operation, the subquery generator 322 may be configured to propagate the update or delete to each of the partitions 330 in parallel, using the appropriate partition keys. The subquery result aggregator 328 may be configured to receive acknowledgements of the update or query from the partitions 330. When all partitions have appropriately acknowledged, the subquery result aggregator 328 may return an aggregated acknowledgement back to the client, which may include for example an aggregated item count affected by the update or delete. By processing updates or deletes to all partitions in parallel, the requests may be performed much more quickly.

In some embodiments, a query may return an APSI hint identifying the partitions that contain items satisfying the query. The APSI hint may then be included in a later update or delete request to reduce the number of partitions that need to be processed. For example, in some embodiments, the APSI hint may be an opaque token that was generated by a previous query and sent to the client as part of the query result. The opaque token may include information that identify the APSI partitions that contain items satisfying the query. In some embodiments, the APSI hint may specify the partition key of the items in the query result. If the client specifies the APSI hint in a subsequent update and the APSI instance ID in the APSI hint is still valid (APSI has not been repartitioned), then the APSI hint allows the service to optimize application of the update operation; subqueries need only be sent to the partitions which contain the items to be updated. If the APSI hint is not included in the update, then the request may be distributed to all partitions because any one of them could contain the item to be updated.

In some embodiments, the storage service may support an "upsert" operation. The operation may specify an update based on a filter condition. If items exist that satisfy the filter condition, they are updated according to the upsert operation. If no items exist satisfying the filter condition, a new item is created according to the upsert operation. In some embodiments, the upsert operation may also be accompanied by an APSI hint. If an APSI hint is specified, the upsert operation may limit is affect to the items specified in the APSI hint. For example, if an upsert operation only specifies items in one partition, the APSI request handler will only forward the upsert operation to that one partition. If a satisfying item exists in the partition, it is updated. If no items satisfying the condition exists in the partition, a new item is created in that partition.

Figure 4:
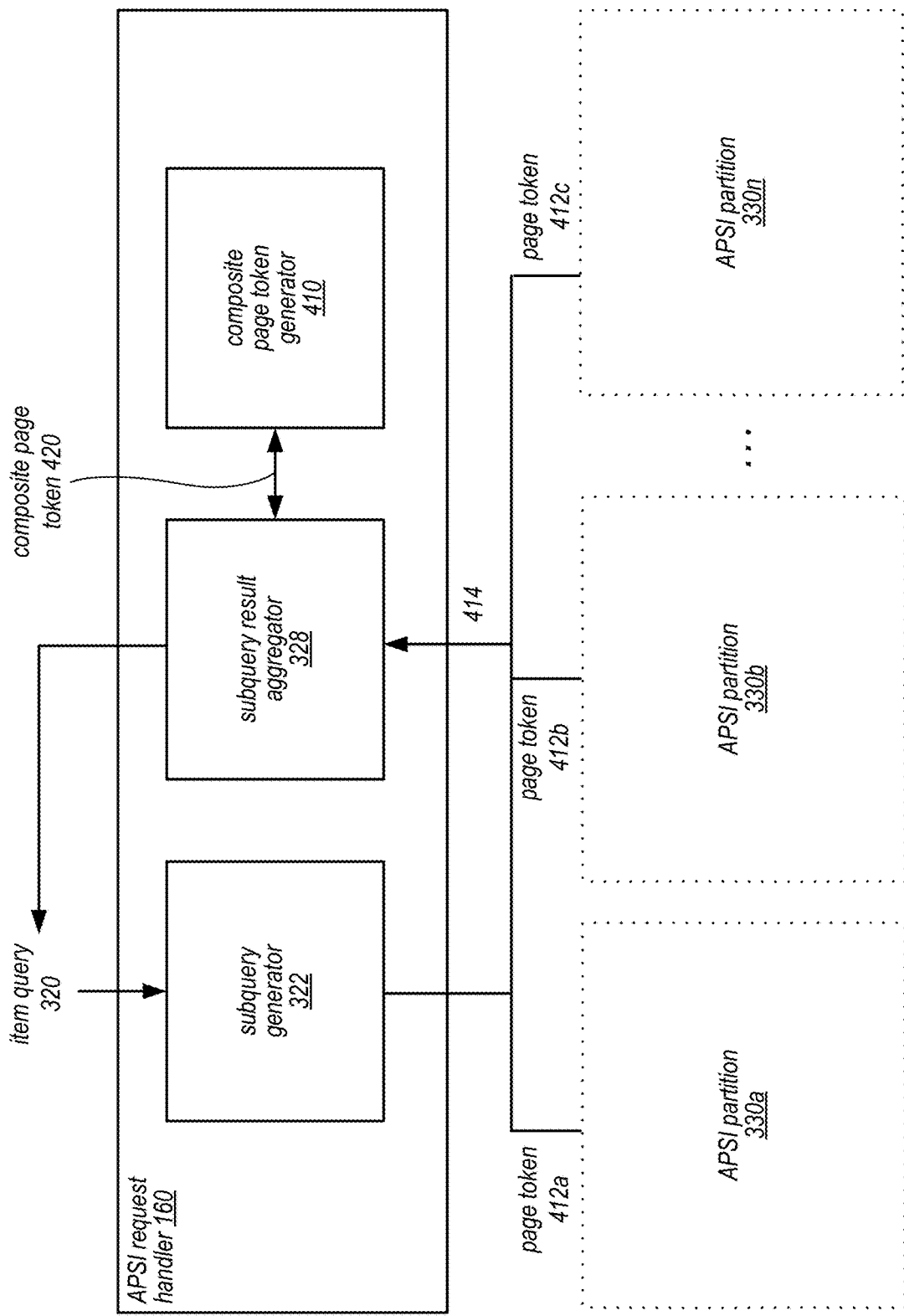
FIG. 4 is a block diagram illustrating components of a computer system that supports pagination of query results using an auto-partitioning secondary index, according to some embodiments.

FIG. 4 a block diagram illustrating components of a computer system that supports pagination of query results using an auto-partitioning secondary index, according to some embodiments. In some embodiments, the storage service 130 may support query result sets that are paginated. That is, in response to a query from the client, instead of returning or fetching the entire result set all at once, the storage service may return pages of results, one page at a time. In some embodiments, the client is provided an access API to navigate through the result set using page tokens. For example, a client may receive a first set of 100 query results as a first page via the API, and receive a page token associated with that set. After the client finishes process the first page, the client may request a second page of query results via the API, using the page token. In some embodiments, the API may allow the client to freely go forwards and backwards in the result set using the page tokens. In this manner, pagination allows clients to work with a large result set, without forcing the client or the storage server to maintain the entire result set in memory.

In some embodiments, the APSI request handler 160 may be implemented to support pagination. In some embodiments, the APSI partitions 330 may individually support pagination. Thus, the partitions 330a-n may return paginated results 414 to the subquery result aggregator 328, including respective page tokens 412a-n. In some embodiments, the page tokens 412a-n each specify a particular location in the result set in fetch order. Thus, for example, page token 412a may indicate a location (e.g., beginning of page 2) and item index (e.g., item 555). In some embodiments, to obtain the next page (page 2) of results, the partition may simply issue a new query directed to all items after item 555.

In some embodiments, when the subquery result aggregator 328 receives page tokens 412a-n, it may call upon an composite page token generator module 410 to generate an composite page token 420 to be returned to the client. In some embodiments, the subquery result aggregator 328 may construct a page of results using the respective pages currently provided by the partitions 330. For example, to construction a page of 100 query results, the subquery result aggregator 328 may take 50 results from the page of results from partition 330a, and 50 results from the page of results from partition 330b. The subquery result aggregator 328 may then pass this information to the composite page token generator 410, which may use this information to generate an composite page token 420, which indicates item positions in each partition (i.e., item 50 in partition 330a, and item 50 in partition 550b) that are associated with the end of the result page. The composite page token 420 may be provided to the client along with the page of results. When the composite page token 420 is received again by the APSI request handler 160, it may use the information in the token to generate subqueries for the next page of results from the partitions 330. For example, the subqueries for the next page of results may be limited to items greater than 50 from partitions 330a and 330b.

In some embodiments, the composite page token generator 420 may generate an composite page token 420 that includes information sufficient to generate the next page of aggregated query results. In some embodiments, the composite page token 420 may include information sufficient to generate respective subqueries to fetch the next page of aggregated results from the respective subqueries.

In some embodiments, the composite page token generator 410 may include in the composite page token 420 an instance identifier associated with an instance of the APSI. In some embodiments, whenever a repartitioning occurs, a new APSI instance is created, along with a new APSI instance identifier. In this manner, page tokens may be tied to a particular instance of the APSI, and thus a particular version of the partitions. In some embodiments, if clients still hold page tokens for a set of partitions that have been repartitioned, the APSI request handler 160 may simply issue a failure when the old page tokens are received. For example, the storage service may respond to the client with a conflict response status when an invalid page token is received.

Figure 5:
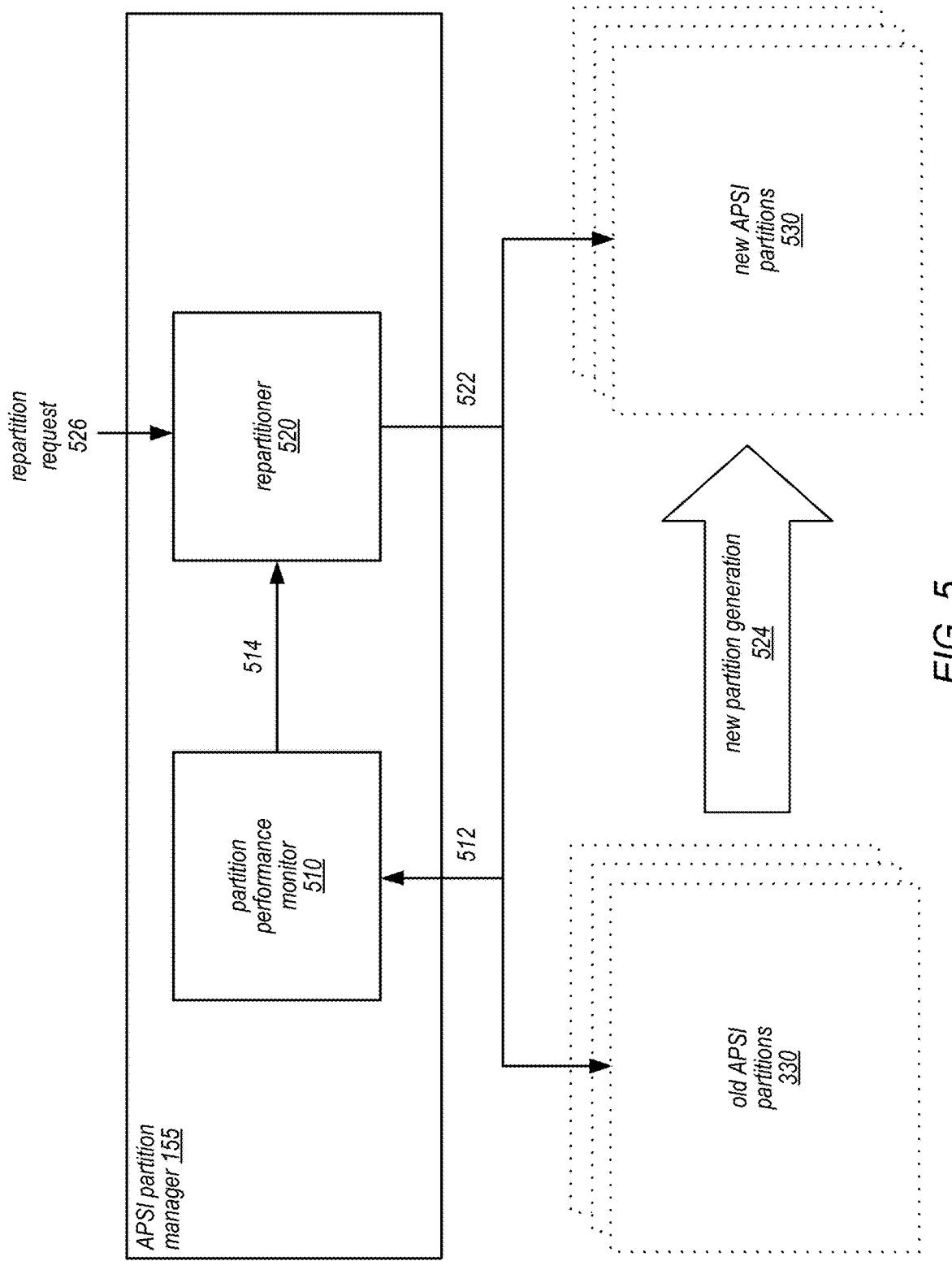
FIG. 5 is a block diagram illustrating components of a computer system that supports repartitioning of an auto-partitioning secondary index, according to some embodiments.

FIG. 5 a block diagram illustrating components of a computer system that supports repartitioning of an auto-partitioning secondary index, according to some embodiments. As illustrated, the APSI partition manager 155, as discussed in connection with FIG. 1, may implement a number of modules to handle APSI partition management for the storage service 130. The modules illustrated herein are merely exemplary. In some embodiments, some of the modules shown may be implemented together in a single module, in a plurality of separate modules, or in a different location in the storage service 130.

In some embodiments, the APSI partition manager 155 may implement a partition performance monitor 510. The partition performance monitor 155 may watch for various conditions 512 that may trigger a repartitioning of an APSI. Depending on the embodiment, the partition performance monitor 510 may be an independently executing process actively observing relevant operating conditions of the APSIs in the storage service, or a passive component that is triggered by other processes. In some embodiments, the triggering of repartition may be determined by the APSI request handler 160, which may maintain relevant statistics and metrics concerning the APSI, and request a repartitioning under certain conditions. In some embodiments, the relevant statistics and metrics may be captured during the APSI's servicing of requests, in some cases by piggybacking off of the operations performed by the APSI. For example, in some embodiments, the results being passed from the distributed partition servers also contain metrics on the performance of each partition. As the results are passed back to the client, the metrics may be extracted and passed to the control plane components, which may take actions based on the metrics, such as repartitioning. In some embodiments, the APSI request handler 160 may pass the metrics to the APSI partition manager 155 or performance monitor 510.

The partition performance monitor 510 may monitor a variety of information, some at different time intervals. In some embodiments, the partition performance monitor 510 may look for access hotspots in particular partitions of particular APSIs. Some metrics that may be used to look for hotspots include, for a given partition, number of accesses received during a time window, peak number of accesses, measured latency in responses, average and peak CPU utilization of the storage nodes, throttling, the number of items stored in the partition, the storage utilization level, the size and capability of the replica group, and the general health of the replica group. This list of metrics is only exemplary.

In some embodiments, another factor that may cause a repartitioning is imbalance among the partitions of an APSI.

In practice, an APSI with unbalanced partitions is not operating optimally. Accordingly, if one partition is growing much larger than the others, or if one partition is experiencing a much heavier load than the others, the partition performance monitor 510 may flag this as a repartition condition. In some embodiments, the partition performance monitor 510 may examine the overall throughput of the APSI as another reason to repartition. For example, if all partitions of an APSI are constantly overloaded, the partition performance monitor 510 determine that the APSI as a whole requires more storage and/or computing resources, and thus flag the APSI to repartition. Conversely, in some embodiments, the partition performance monitor 510 may be configured to recognize from the metrics that an APSI is employing more computing or storage resources than is necessary. In that case, the partition performance monitor 510 may cause the APSI to be repartitioned to reduce the number of partitions. In some embodiments, the APSI may adaptively or even proactively grow and shrink and APSI as needed, based on the operating conditions of the APSI. In some cases, such periodic adjustments may reduce the cost of maintaining the APSI for the client in the long run.

In some embodiments, when the partition performance monitor 510 make a decision to initiate a repartition, an alert or notification may be sent to an account management system associated with the storage service, indicating that a repartition has occurred or is about to occur. In some embodiments, the notification may allow a client to override or modify the decision of the partition performance monitor 510. The notification may indicate the new number of partitions associated with the APSI and other information such as the reason for the repartition and any associated metrics data or statistics reflecting the condition that triggered the repartition.

In some embodiments, the APSI partition manager 155 may implement a repartitioner 520. The repartitioner 520 may be responsible for interacting 522 with the partitions to carry out the actual repartition of the APSI. The repartitioner 520 may receive an instruction or request 514 from the partition performance monitor 510 to repartition an APSI, including certain controlling parameters of the repartition. In some embodiments, the repartitioner may itself make certain high level decisions to establish a repartition plan (e.g., the number of new partitions, any particular mappings of partition key values), and leave the details of the actual repartitioning to the storage nodes and/or components in the control plane, including for example the master replica nodes in the old and new partitions. In some embodiments, the actual partitioning may be performed in part by the APSI request handler 160.

In some embodiments, the repartitioner 520 may provide an API, such that it may be invoked by upper level components in the storage service 130, or the client 110. For example, in some embodiments a client 110 may submit an explicit repartition request 526 to the repartitioner 520, to cause a particular APSI to repartition.

In some embodiments, during the repartition process, the repartitioner 520 may cause new APSI partitions 530 to be created. In some embodiments, the repartitioner 520 may rely on elements in the control plane, for example another module or auto admin instance 150, to create the new partitions 530 and a new APSI instance. In some embodiments, the repartitioner 520 may rely on the APSI request handler 160 to generate 524 the new partitions 530 by copying over items from the old partitions 330 of the old APSI instance to the new partitions 530 of the new APSI instance. The copying procedure may include assigning a new partition key value to each of the items in the old partition 330. In some embodiments, the repartition 520 may determine the number and/or configuration of the new partitions 530, and provide to the APSI request handler 160 a set of new partition key values to be used to copy over the items to the new partitions 530.

In some embodiments, the repartitioner 520 and/or the APSI request handler 160 may perform the repartitioning process in the background, without taking the old partitions 330 of the APSI offline. When the repartitioning process is complete, the repartitioner 520 and/or APSI request handler 160 may cause the associated table to switch over to the new partitions 530. In some embodiments, the storage service may associate the APSI name with an APSI instance managing a set of APSI partitions. At the end of the repartition process, the storage service may cause the APSI name to switch over to the new APSI instance. At that point, some of the resources for the old partitions 330 and the old APSI instance may be deallocated and/or de-provisioned. In the event that updates to the APSI are received during the repartitioning process, the repartitioner 520 and/or APSI request handler 160 may keep track of the updated items, so that they are also reflected new partitions 530.

FIG. 6 illustrates an exemplary schema that may be used to describe an auto-partitioning secondary index, according to some embodiments. The exemplary schema 600 may be associated with metadata objects that describe the properties of an APSI. In some embodiments, the schema 600 may be used to create and/or validate the APSI metadata objects. In some embodiments, the storage service 130 may store APSI metadata in a data store, along with the metadata for other objects. The storage service 130 may provide an API to allow clients 110 to modify the object definitions, which may be reflected as changes in the object metadata. In some embodiments, the storage service 130 may provide an API call to provide the object metadata for an APSI, or the table associated with the APSI. For example, the storage service 130 may expose a "describe APSI" service call or command, which when invoked, returns the metadata for a requested APSI.

In some embodiments, the storage service 130 may implement an alarm or notification service, which reports periodically or based on detected events the current state of objects in the storage service 130. For example, as discussed above, in some embodiments the storage service 130 may notify an account management system whenever an APSI is repartitioned. In some embodiments, the alert or notification may include the full contents of the metadata of the repartitioned APSI. In some embodiments, the alert or notification may be provided as a human readable message, such as an email or text. In some embodiments, the alert or notification may be provided as a metadata object, via a call specified in an API.

As illustrated, the schema 600 describes a table 602. In some embodiments, the table 620 may be associated with a plurality of APSIs 610. In the figure, the brackets indicate a one-to-many relationship between a parent element and a child element, while the braces indicates a compound element. As shown, the table 602 may contain its own metadata attributes, such as the table name 604, a list of attribute definitions 606, which may indicate an attribute name and an attribute type. The attribute type may specify a categorization of all item attributes supported by the storage service 130. For example, attribute types may include numbers, dates, etc. In some embodiments, the storage service 130 may support user-defined attribute types.

As shown, each APSI associated with the table may be specified by the APSI schema definition 610. In some embodiments, the APSI schema definition 610 may correspond to a metadata object that describes the APSI. The APSI schema definition 610 may include a set top-level metadata attributes. These top-level attributes may include, for example, the APSI's name 612, the APSI's status 614, the partition count 616, the minimum 617 and maximum 618 number of partitions, and the maximum partition frequency 619.

The index status 614 may indicate a current operating state of the APSI. The status 614 may indicate, for example, whether the APSI is online or offline, or that it is in the process of being created or repartitioned, etc. In some embodiments, the status 614 may indicate one or more error conditions of the APSI. For example, in some embodiments the status 614 may indicate that the APSI is experiencing heavy load and throttling requests, or that the APSI has experience a crash and its being recovered, etc.

The minimum 617 and maximum 618 partition counts may be a client-configurable set of limits on how many partitions that an APSI may have. Thus, in some embodiments, the storage service 130 may be free to auto partition the APSI to increase or decrease the number of partitions, but the auto partitioning is constrained by the minimum 617 and maximum 618 partition counts. The maximum partition frequency 619 may be a client configurable limit on how frequently a repartition may occur. For example, the APSI may be limited to one repartitioning per month, to avoid excessive changes to the APSI. In some embodiments, the client 110 may be permitted to specify additional constraints on the repartitioning process.

As illustrated, the APSI schema definition 610 may include a key schema element 620. The key schema element 620 may specify the key attributes that are used by the APSI. Each key attribute of the APSI may be specified by the attribute name 622 and a key type 624. The key type 624 may specify any type of key supported by the storage service 130. For example, in some embodiments, the key types may include a partition key, a primary key, a first sort key, a second sort key, etc. In some embodiments, an APSI may always include a partition key, which dictates how the APSI is partitioned. In some embodiments, an APSI may indicate in the key type that the partition key is an auto-generated partition key. In some embodiments, an APSI partition key may be defined to include multiple auto-generated attributes. In some embodiments, a primary key may be a unique identifier for the item. In some embodiments, the primary key may include the partition key. In some embodiments, the sort key(s) may dictate how the order that the items are stored in each partition. In some embodiments, the sort key(s) may be optional. That is, an item without a particular sort key attribute will still be stored in the index. However, such an item will be assigned a default sort value for the sort key.

As illustrated, the APSI schema definition 610 may include a partitions element 630. The partitions element 630 may include a list of descriptors, one of each partition of the APSI. Each partition descriptor may include a set of attributes, for example, a partition name 632, a partition item count 634, and a partition size bytes 636. In some embodiments, additional partition-specific metadata may be stored as a part of the APSI metadata. Some of the stored metadata may be used by one or more components of the storage service 130 to determine whether a repartitioning of the APSI is needed.

It may be appreciated that the schema definition for the table 602 and the APSI 610 in the storage service 130 may vary from embodiment to embodiment. The exemplary schema 600 is presented herein for illustrative purposes, and is not intended to be limiting. Different embodiments of the storage service 130 may include more, less, or different information in its object metadata.

Figure 7:
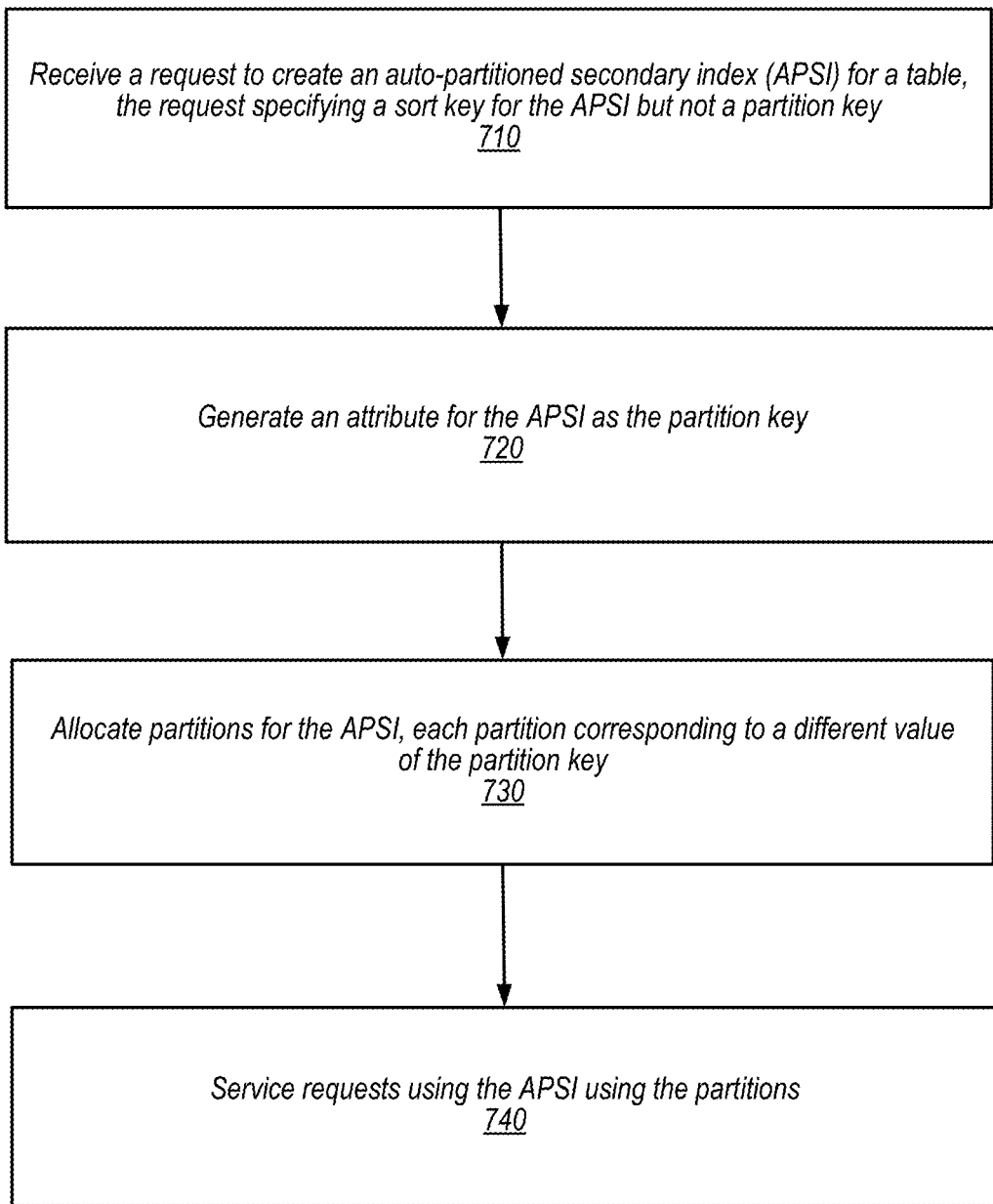
FIG. 7 is a flowchart illustrating a creation of an auto-partitioning secondary index, according to some embodiments.

FIG. 7 is a flowchart illustrating a creation of an auto-partitioning secondary index, according to some embodiments. In some embodiments, the creation process may be performed by a combination of the APSI partition manager 155 and the APSI request handler 160, as discussed in connection with FIG. 1.

In operation 710, a request to create an APSI for a table is received, where the request specifies a sort key for the APSI but not a partition key. The request to create the APSI may be part of a request to create the table, or it may be a separate request to add an APSI to an existing table. In some embodiments, a table or other object may be configured to automatically create an APSI based on received queries. For example, a table may receive a query that specifies a sort criteria, but not the partition key of the table. The sort criteria may involve a filter condition of the query (e.g., top 5 results, query range, etc.), a "sort by" condition of the query, or some other query parameter requiring sorting. In response to the query, the database system may determine that an APSI should be created to service these types of queries in the future. In some embodiments, the APSI creation request may specify additional parameters, for example the initial number of partitions to allocate for the APSI, the maximum number of partitions for the APSI, and/or the minimum number of partitions for the APSI. In some embodiments, the items' sort key values dictate the order that the items are stored in the APSI partitions. As discussed, one of the benefits of the APSI is that it allows the client to not specify a partition key in its interactions with the APSI, leaving such details to the storage service itself.

In operation 720, an attribute is generated for the APSI as the partition key. In some embodiments, the attribute is not an attribute that is previously defined in the table. In some embodiments, the attribute is limited to one of the plurality of key values. As discussed, the added attribute may be an auto generated partition key whose value determines which partition an item is stored in.

In operation 730, a plurality of partitions is allocated for the APSI, each partition corresponding to a different key value of the partition key. In some embodiments, the partition manager 155 may determine an appropriate number of partitions to allocate for an APSI. The partition manager 155 may determine other properties of each APSI partition, such as the partition's size. In some embodiments, the partition manager 155 may provision storage nodes to manage the partition, which may include the formation of a replica group and the election of a master replica for the group. Each partition may be designated with a partition key value, which in some embodiments may be a numerical value, for example an integer in the range of 0 to 9.

Figure 9:
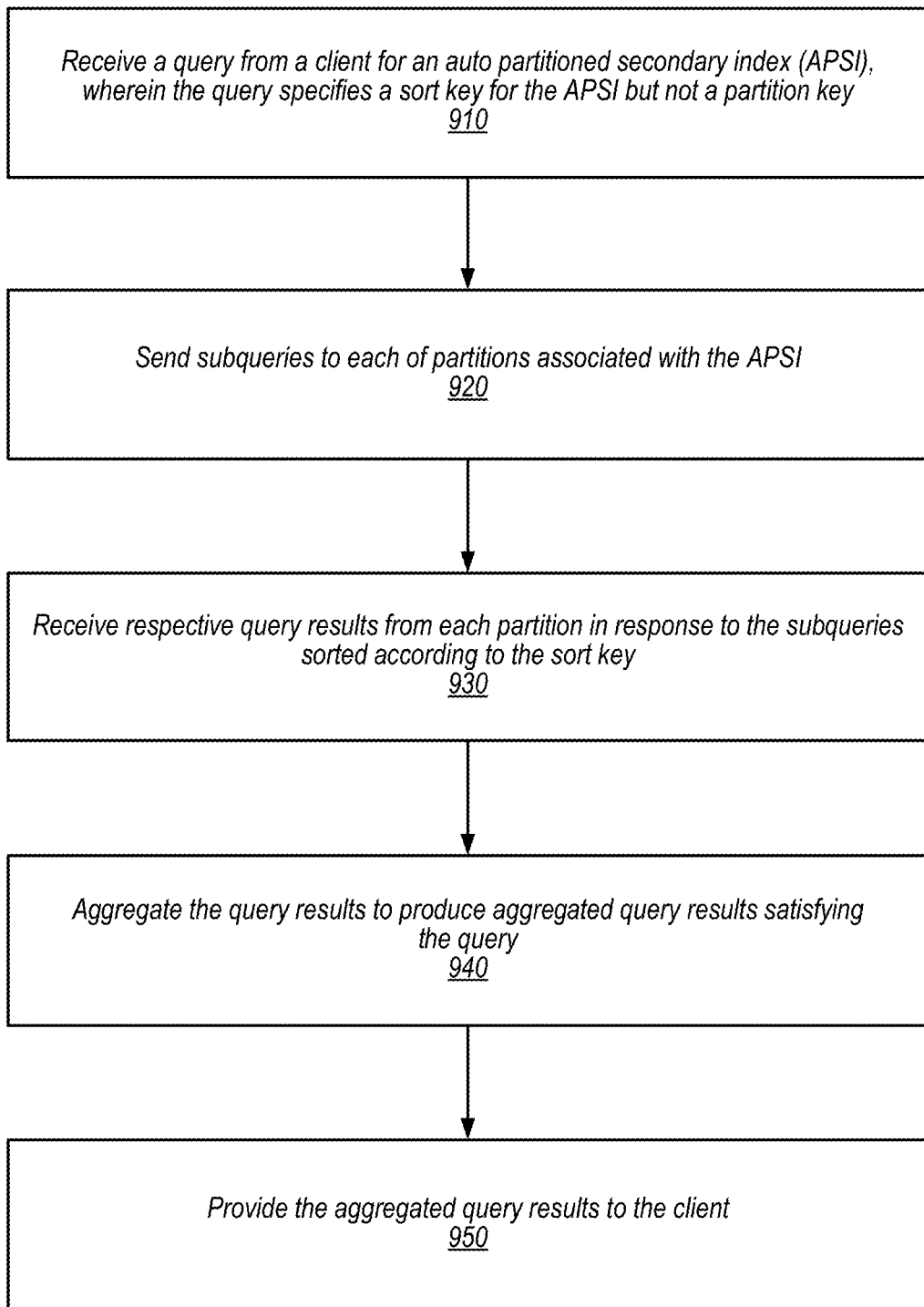
FIG. 9 is a flowchart illustrating a query of an auto-partitioning secondary index, according to some embodiments.
Figure 10:
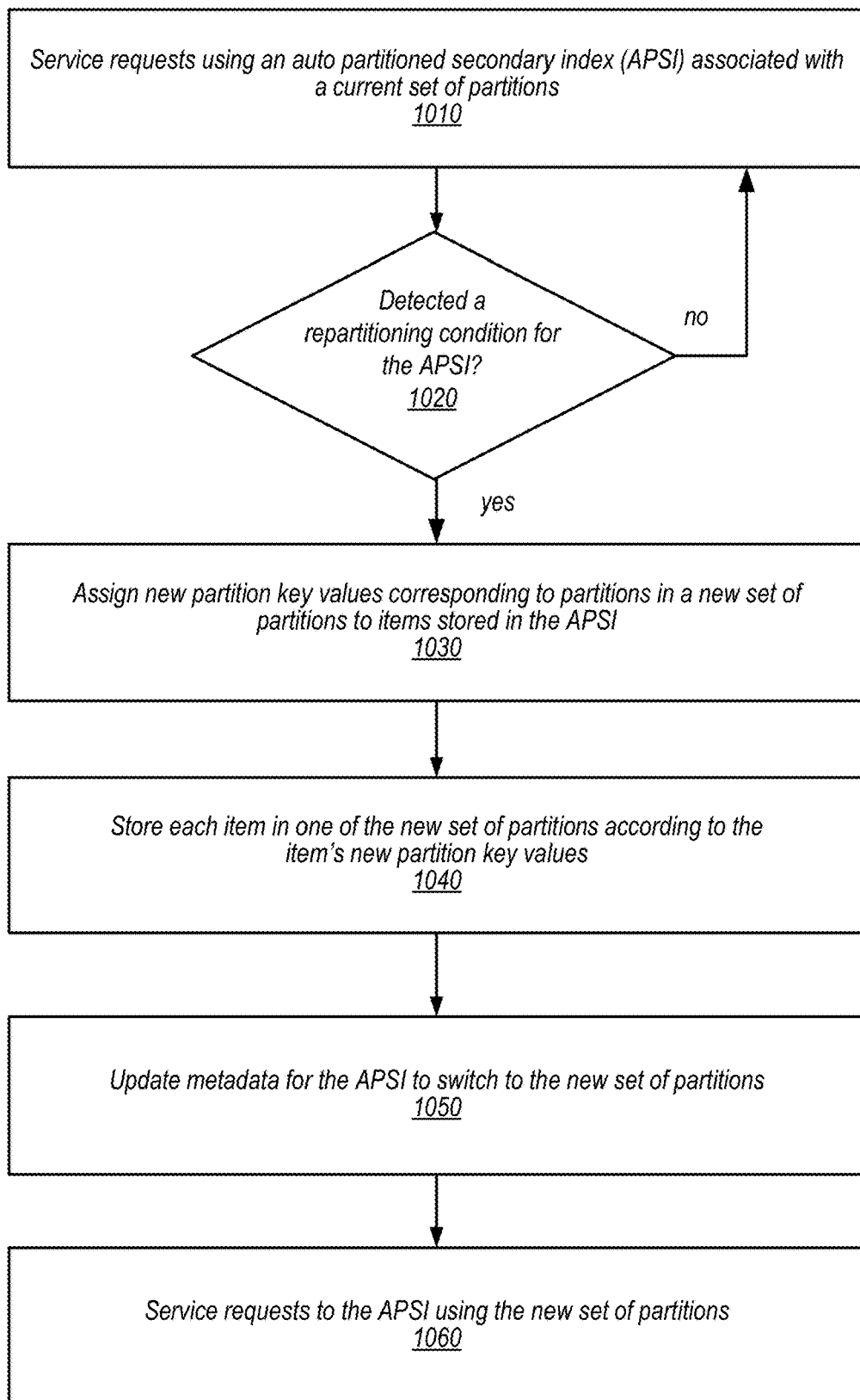
FIG. 10 is a flowchart illustrating a repartition of an auto-partitioning secondary index, according to some embodiments.

In operation 740, the APSI is services requests using the partitions. After operations 720 and 730 are complete, in some embodiments, the APSI may be deemed created, and made available to service requests. In the case where the APSI is created for an existing table, the APSI may begin to immediately replicate the items in the table. In the case where the APSI is created with the table, it may simply remain empty, until further requests are received or further events or conditions are detected. These interactions are depicted in FIGS. 8, 9, and 10, as described below.

Figure 8:
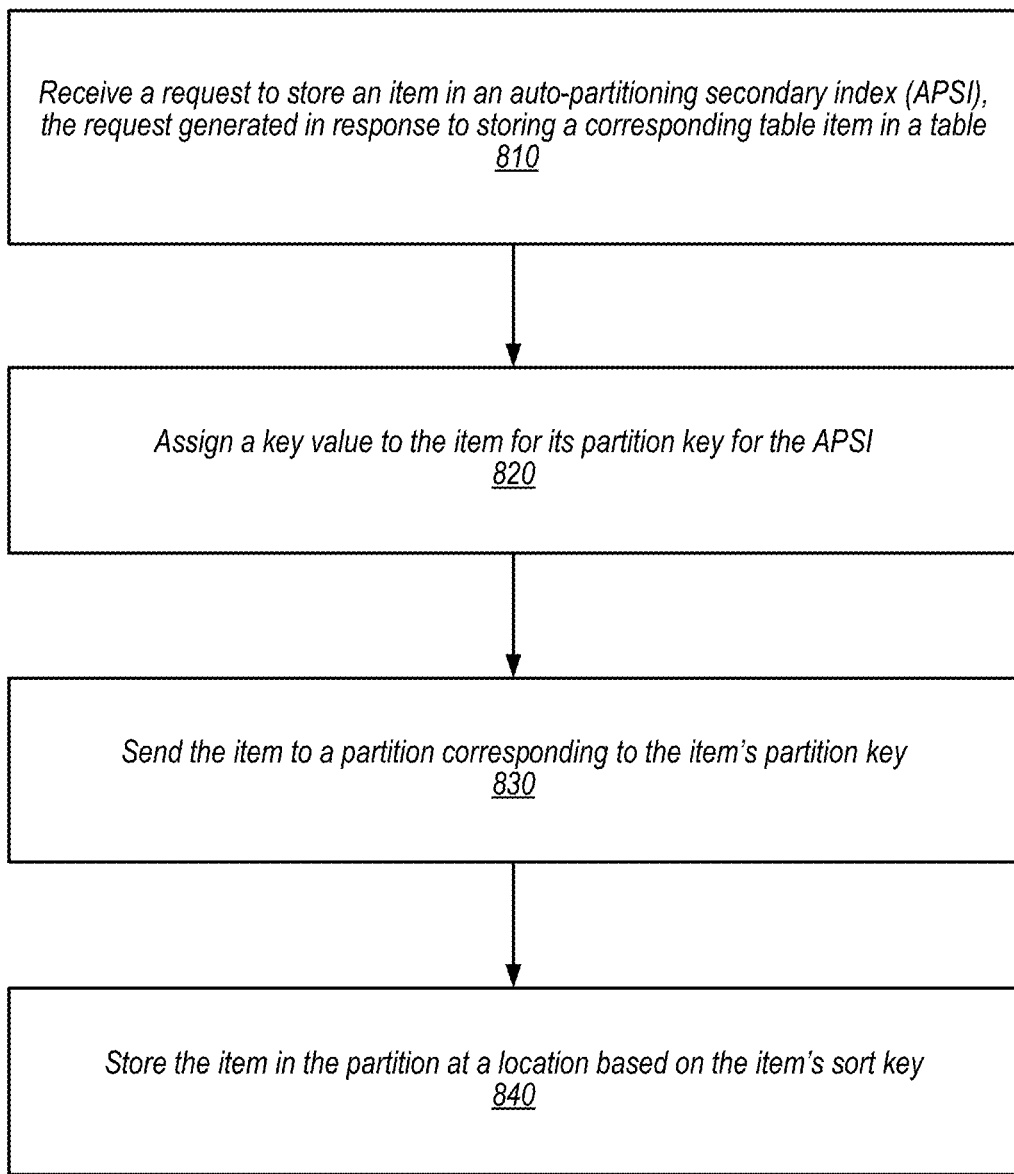
FIG. 8 is a flowchart illustrating an insertion into an auto-partitioning secondary index, according to some embodiments.

FIG. 8 is a flowchart illustrating an insertion into an auto-partitioning secondary index, according to some embodiments. In some embodiments, the insertion process may be performed by a APSI request handler 160, as discussed in connection with FIG. 1.

At operation 810, a request is received to store an item in an APSI, wherein the request is generated in response to storing a corresponding table item in a table associated with the APSI. In some embodiments, the APSI may maintain a sort key, such that items are stored in the partitions in a sort order based on the sort key of the items. In some embodiments, the request may be generated as a result of an insert to the table associated with the APSI. As discussed, the APSI in some embodiments may shadow the table by replicating the items in the table.

At operation 820, the item is assigned a key value for its partition key for the APSI. In some embodiments, the assignment may be performed by a partition selector 312, as discussed in connection with FIG. 3. In some embodiments, the assignment may be performed on a round robin basis, to keep the sizes of the partitions in relative balance. In some embodiments, the assignment may be performed in pseudo-random fashion. In some embodiments, the assignment may use a hash function to hash one or more other attributes of the item of determine the partition key. In some embodiments, the assignment may take into account other factors to assign the partition, including the current usage level of the partitions and/or the current capabilities of the partitions. In some embodiments, the partition key assignment process may support any one of the above methods, or a combination thereof, and may be configurable by the client.

At operation 830, the item is sent to a partition of the plurality of partitions corresponding to the item's partition key is determined. As discussed, in some embodiments, each partition may comprise a group of storage nodes that manages the data of the partition as a unit. In some embodiments, the APSI request handler 160 may forward the request to store the item to a storage node in the partition. In some embodiments, the receiving storage node may be the master replica node in a replica group maintaining the partition.

At operation 840, the item is stored in the partition at a location based on the item's sort key. In some embodiments, operation 840 may be performed by one or more storage nodes in the partition. In some embodiments, the item may be stored in multiple replicas in the replica group, in accordance with a durability policy of the storage service. In some embodiments, the item may be stored in a location within the partition in accordance with its sort key value. Thus, the partition may maintain all of its items in sorted order. As discussed, by storing the items in sorted order, the partition may be optimized for certain queries that specify conditions based on the sort key. In some embodiments, the item may not necessarily have a value for the sort key. In that case, the item may be sorted according to the NULL value for the sort key.

FIG. 9 is a flowchart illustrating a query of an auto-partitioning secondary index, according to some embodiments. In some embodiments, the query process may be performed by a APSI request handler 160, as discussed in connection with FIG. 1.

At operation 910, a query is received from a client for an APSI, where the query specifies a sort key for the APSI. In some embodiments, the query does not need to specify the partition key for the APSI. In some embodiments, the request may be received by a particular storage node that is the responsible APSI request handler 160 for an APSI. The APSI request handler 160 node may be one special node, a group of special nodes, or any storage node of the storage service 130. In some embodiments, the role of the APSI request handler 160 may rotate periodically among the nodes based on a rotation protocol. As discussed, the query itself does not need to specify the partition key of the APSI. One of the benefits of the APSI is that it allows the client to not specify a partition key in its interactions with the APSI, leaving such details to the storage service itself. In some embodiments, the query may specify a query condition based on a sort key maintained by the APSI. For example, the query may include a range condition that limits query results to within a range of the sort key. As discussed, in some embodiments, the APSI may store items in the partitions in sorted order based on the sort key value of the items.

At operation 920, subqueries are sent to each of a plurality of partitions associated with the APSI. For example, in some embodiments, the APSI request handler 160 may determine that the APSI currently uses ten partitions having ten different partition keys, and fan out ten subqueries to the ten partitions in parallel. In some embodiments, the APSI request handler 160 may perform an optimization where it determines that some partitions may be excluded from the query. For example, in some embodiments, the items may be partitioned based on a hash of some attributes of APSI. The APSI request handler 160 may determine from the query and the hash function that only a subset of partitions can possible hold items that satisfy the query. Accordingly, the APSI request handler 160 only issue subqueries to the subset of partitions.

At operation 930, respective subquery results are received from each partition in response to the subqueries. In some embodiments, the subquery results may not be received in sorted order according to the sort key, or be received in pages, and the subquery results aggregator may perform a global sort of the subquery results. As discussed, in some embodiments, partitions may store and fetch the items in sorted order according to its sort key. In some embodiments, the subqueries may perform some of the filtering work that is specified in the query. In some embodiments, the query may specify that the query results should not be globally sorted. This option is useful in cases where the results are obtained in pages from the partitions, and thus a global sort would be very time consuming. In that case, the client may wish to not wait for the results to be provided in sort order, but instead receive some results as soon as possible. Thus, the client may specify in the query that results should not be sorted.

At operation 940, the query results from the subqueries are aggregated to produce aggregated query results satisfying the received query. In some embodiments, a subquery result aggregator (for example subquery result aggregator 328) may simply merge the results from each of the partitions to create the aggregated query results. In some cases, the aggregator may perform additional work. For example, in some embodiments, the parent query may specify a sort order. The subquery result aggregator 328 may take the results and place the results in a global sort order. In some embodiments, the parent query may specify that the results should not be sorted. In that case, the subquery results aggregator 328 may not sort the aggregated result set, which may in some cases allow some results to be returned immediately. In some embodiments, the subquery result aggregator 328 may perform additional filtering of the query results during the aggregation operation. For example, if the query asks for only the top 5 results based on a sort order, the subquery result aggregator 328 may receive the top 5 results from each partition, and select five results from the partition sub-results to produce a global top 5.

In some embodiments, the subquery result aggregator may manage the pagination of results. For example, in some embodiments, the subquery result aggregator may take the results provided by the partitions, and repeatedly generate pages of aggregated results (e.g., 100-result pages). Along with each page of aggregated results, the subquery result aggregator may generate a composite page token, indicating the item locations in each partition's result set that correspond to the end of the page. In some embodiments, this composite page token may be provided to the client as an object that captures the state of the query paging, so the client may later pass the token back to the APSI request handler to generate a new query to fetch the next page of results. In some embodiments, the composite page token may include partition page tokens generated each of the partitions in the APSI.

In some embodiments, the composite page token generator 410 may include in the composite page token an instance identifier for an APSI instance, thus tying the composite page token to a particular version of the partitions. In some embodiments, the storage service may simply invalidate all page tokens associated with a set of old partitions when the APSI is repartitioned. In some embodiments, the storage service may maintain the old partitions of the APSI for a period of time after a repartitioning, for example by allowing the old APSI instance to continue running, so that old page tokens held by client can still be used to fetch result pages.

At operation 850, the aggregated query results are provided to the client. The aggregated query results may be provided in any method supported by the storage service. In some embodiments, the aggregated results may be provided in pages, along with a composite page token. In some embodiments, the aggregated query results may be provided as an XML-formatted data set. In some embodiments, the aggregated query results may be provided as a data object in accordance with a call API supported by the storage service.

In some embodiments, some of the described the functionality used for handling of queries may also be used to handle updates or deletes to the APSI. For example, in some embodiments, in response to an update or delete operation, a subquery generator (for example subquery generator 322) may be configured to propagate the update or delete to each partition of the APSI in parallel, using the appropriate partition keys. The subquery result aggregator may be configured to receive acknowledgements of the update or query from the partitions. When all partitions have appropriately acknowledged, the subquery result aggregator may return an aggregated acknowledgement back to the client. Because updates and deletes may be sent to and performed by each of the partitions in parallel, the performance of these requests is drastically improved.

FIG. 10 is a flowchart illustrating a repartition of an auto-partitioning secondary index, according to some embodiments. In some embodiments, the repartitioning process may be performed by a combination of the APSI partition manager 155 and the APSI request handler 160, as discussed in connection with FIG. 1.

At operation 1010, requests are serviced using an APSI associated with a current set of partitions. As the APSI is used, items may be added to or removed from the partitions of the APSI. In addition, certain access metrics and/or statistics may be captured by the APSI request handler 160, the APSI partition manager 155, or other elements in the storage service's control plane. For example, in some embodiments the results being passed from the distributed partition servers may contain metrics on the performance of each partition. As the results are passed back to the client, the metrics may be extracted and passed to the control plane components, which may take actions based on the metrics, such as repartitioning. In some embodiments, the APSI request handler 160 may pass the metrics to the APSI partition manager 155 or performance monitor 510. Thus, the capturing of performance metrics information may be piggybacked off of the normal operations of the APSI request handler 160.

At operation 1020, a determination is made whether a repartitioning condition for the APSI has been detected. In some embodiments, the determination may be performed by for example the partition performance monitor 510, as discussed in connection with FIG. 5. The repartition condition may comprise a variety of conditions. In some embodiments, the partition performance monitor 510 may determine that the data stored in the partitions of an APSI are out of balance. For example, in some embodiments, one partition may be storing large number of items relative to the other partitions. In some embodiments, one partition may be exhibiting an access hotspot which may warrant repartitioning. For example, a hotspot may be detected based on the number of access requests, the volume of data updated or retrieved, the latency associate with the requests, and/or the peak CPU utilization rate for the storage nodes, among other things. In some embodiments, a repartition may be triggered based on the overall level of access received by the APSI. For example, if the entire APSI is frequently being overloaded, this may cause a repartition to increase the number of partitions in the APSI.

At operation 1030, new partition key values are assigned to items in the APSI corresponding to partitions in a new set of partitions. Operations 1030 to 1050 may comprise a repartitioning process that is performed or coordinated by the repartitioner 520, as discussed in connection with FIG. 5. In some embodiments, the repartitioning process may allocate new partitions as the new set of partitions, in a manner similar to the APSI's creation process. Existing items in the APSI's existing partitions may be reassigned to new partitions in the second plurality of partitions, based on some method. In some embodiments, a new APSI instance may be created as a result of the repartitioning process. As discussed, the repartitioning process may be implemented according to a variety of methods. In some embodiments, the partition key assignment strives to keep the new partitions of the APSI relatively balanced, based on the performance metrics used to manage the repartition. In some embodiments, the repartitioning process may increase the number of partitions. In some embodiments, the repartitioning process may reduce the number of partitions, where it is determined that the usage level of one or more partitions does not warrant the amount of computing resources dedicated to the partitions.

At operation 1040, each item is stored in one of the new set of partitions according to the item's new partition key value. In some embodiments, operation 1040 may be performed by the APSI request handler 160, as directed by the APSI partitioning manager and/or repartitioner 520. In some embodiments, operation 1040 may include a copying operation that copies items from the existing partitions of the current APSI instance to the new partitions of the new APSI instance. In some embodiments, during operations 1020, 1030, and 1040, the existing partitions of the current APSI instance may continue to be used to service requests for the APSI. Updates that occur to the APSI during the repartitioning process may be tracked so they are not lost.

At operation 1050, metadata for the APSI is updated to switch to the new set of partitions. As discussed, in some embodiments, the repartitioning process may involve a provisioning and allocation operation, and a long-running copy from the old partitions of the current APSI instance to the new partitions of the new APSI instance. During the process, clients may be allowed continued access to the APSI. However, when the repartition process is completed, i.e., when the new set of partitions are fully populated, the APSI may be switched to use the new set of partitions. In some embodiments, this switch may involve an update to the APSI metadata which specifies addresses of the storage nodes of the partitions. In some embodiments, the storage service may switch over to the new APSI instance by associating an APSI name with the new APSI instance, so that any request directed to the APSI name will be serviced by the new APSI instance.

At operation 1060, requests to the APSI are serviced using the new set of partitions. Operation 1060 may operate similar to operation 1010, but using the new set of partitions, which may be associated with a new APSI instance. In some embodiments, the old set of partitions may be maintained for a time period, to allow for old page tokens that have been distributed to the clients to be used. However, at some point in time, the old APSI instance and the old partitions associated with it may be de-provisioned and deallocated, so that the storage nodes and storage space associated with the old partitions may be reclaimed by the storage service.

Figure 11:
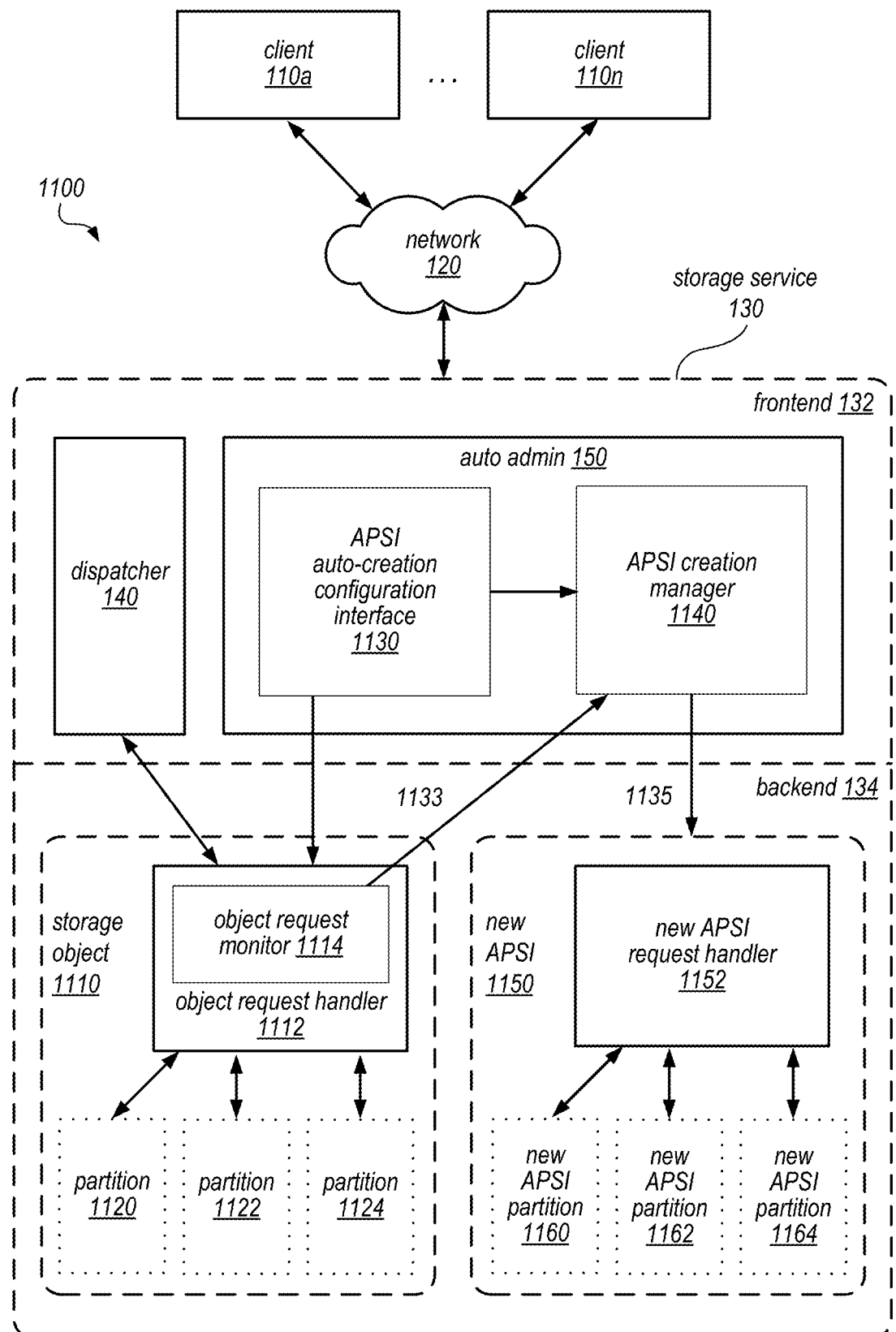
FIG. 11 is a block diagram illustrating an example computer system that implements the auto-creation of auto-partitioning secondary indexes, according to some embodiments.

FIG. 11 is a block diagram illustrating an example computer system that implements the auto-creation of auto-partitioning secondary indexes, according to some embodiments. In some embodiments, the system 1100 may be implemented using similar components as discussed in connection with FIG. 1. For example, as illustrated, system 1100 may service the clients 110*a-n* over the network 120, as discussed in connection with FIG. 1. System 1100 may also comprise a storage service 130 having a frontend 132 and backend 134, as discussed in connection with FIG. 1. The frontend 132 may include a dispatcher 140 that is tasked with forwarding client requests to the different storage objects of the storage service 130, and also an auto admin module or subsystem 150, that automatically performs certain administrative functions of the storage service 130, as discussed in connection with FIG. 1.

As illustrated, the auto-creation functionality may be implemented using modules in both the data plane and the control plane. For example, as shown, an object request monitor 1114 may be implemented in a storage object 1110 in the data plane, which may be responsible for triggering 1133 the creation of an APSI, based on received object requests. As shown, an APSI creation manager 1140 may be implemented in the auto admin subsystem 150 in the control plane, which may be responsible for the mechanics of actually creating 1135 the new APSI. However, the modules shown in the figure are merely exemplary, and different functions may be implemented in different entities of the storage service to implement the auto-creation functionality, as will be appreciated those skilled in the art.

As illustrated, the storage object 1110, which may be for example a database table, may receive requests via an object request handler 1112. The object request handler 1112 may forward the received requests to the individual partitions 1120, 1122, and/or 1124 of the object, which may be independently managed by a cluster of nodes. As shown, the object request handler 1112 may implement an object request monitor 1114, which may monitor incoming requests to the storage object 1110 for a number of purposes (e.g., statistics gathering, etc.). In some embodiments, one of the purposes may be to automatically trigger the creation of an APSI, in response to an incoming request. In some embodiments, the actual determination of creating the APSI may not reside with the storage object 1110 in the data plane. For example, the storage object 1110 may only collect statistics, which are periodically examined by the auto admin subsystem 150, which in turn makes the decision to auto-create the APSI. However, in some embodiments, the storage object 1110 may be configured to directly trigger the auto-creation, and in some cases, provide immediate feedback to the requesting client that an auto-creation process has been initiated in response to the request.

The triggering condition for the auto-creation may be different from embodiment to embodiment. In some embodiments, a query that specifies a sort condition for an attribute that is not optimized to handle the sort condition may trigger the auto-creation. For example, a sort condition may involve a filter condition that requires sorting (e.g., top 5 results, a search range), a "sort by" instruction included in the query, or other query parameters that may indicate sorting. In handling the query, the storage object 1110 may determine that sorting is required, but that the organization of its data is not optimized to handling the sorting. For example, a query may request the top 5 result based on a time attribute, but the table's data is not stored in sorted order according to the time attribute. Accordingly, the table may need to perform a full scan of all of its data items to determine the top 5 result. This situation may cause the storage object to initiate an auto-creation of an APSI that stores the time attribute in sorted order, so that future queries with that type of sort condition may be performed more efficiently using the APSI.

In some embodiments, another triggering condition for auto-creation may be a query that does not specify the partition key of the table. In some embodiments, a missing partition key condition may indicate to the storage service that the service should automatically create an APSI based on the query, if an appropriate APSI does not already exist. On the other hand, in some embodiments, the query may suppress the auto-creation of APSIs by including a query parameter or directive, specifying that the storage service should not use the query to create an APSI. This suppression parameter or directive may be recognized by the object request handler 1112 or object request monitor 1114, so that an auto-creation is not triggered 1133 when the parameter or directive is encountered.

As will be appreciated by those skilled in the art, other triggering conditions may be used to auto-create the APSI. For example, in some embodiments, the trigger may depend on collected statistics of the storage object 1110. In some embodiments, the APSI may be created after a number of qualifying queries of a particular type has been received, resulting in full table scans. In some embodiments, the table's size or number of partitions may be taken into account in the determination to create an APSI. In some embodiments, a client may specify in a configuration file that APSIs should never be created to sort certain attributes.

In some embodiments, the triggering condition of auto-creation may be complex, and may be configurable by the client or an administrator of the storage service 130, via for example an APSI auto-creation configuration interface 1130, as illustrated in the figure. The configuration interface 1130 may be used to configure different aspects of the auto-creation process, implemented by both the object request monitor 1114 and the APSI creation manger 1140. In some embodiments, the configuration interface 1130 may comprise one or more graphical user interfaces that allows a user to specify configuration parameters for the auto-creation process. In some embodiments, the configuration interface may include one or more configuration files that indicate the configuration parameters.

In some embodiments, the configuration interface 1130 may allow a user to specify how a triggering query is handled after a determination that an APSI should be auto-created. As one possibility, the storage service 130 may service query inefficiently using the storage object 1110. As another possibility, the storage service 130 may not service the query, but respond back to the requestor with an error code, indicating that an APSI is being created, and to try the query at a later time. Such behavior may be configurable via the configuration interface 1130.

In some embodiments, the configuration interface 1130 may also allow the user to specify a forwarding of future queries to the newly created APSI. For example, after the new APSI 1150 is auto-created, a client may continue to issue queries to the storage object 1110. In some embodiments, the object request monitor 1114 may recognize that certain future queries can be more efficiently handled by the new APSI, and simply forward those queries to the new APSI. This behavior may also be configurable via the configuration interface 1130.

As illustrated, the auto admin subsystem 150 may implement the APSI creation manager 1140 to manage the auto-creation process. In some embodiments, the auto-creation process may occur in a fashion similar to the process discussed in connection with FIG. 7. That is, the auto-creation may generate an attribute for the partition key of the APSI, and then allocate a number of new APSI partitions 1160, 1162, and 1164 for the new APSI 1150. In addition, the APSI creation manager 1140 may specify a sort key for the new APSI that matches the attribute used in the sort criteria of the triggering query. This way, data items will be sorted according to the attribute in the partitions, and future queries with that sort criteria may be performed more quickly using the new APSI. Once the new APSI partitions are allocated, data from the storage object 1110 may be copied to the new APSI 1150 in a possibly long-running process. In some embodiments, the auto-creation process may be implemented as a standard internal operation to create a new secondary index instance for a table, and the APSI creation manager 1140 simply invokes that operation with a set of parameters indicated by the object request monitor 1114 and/or configuration parameters.

Figure 12:
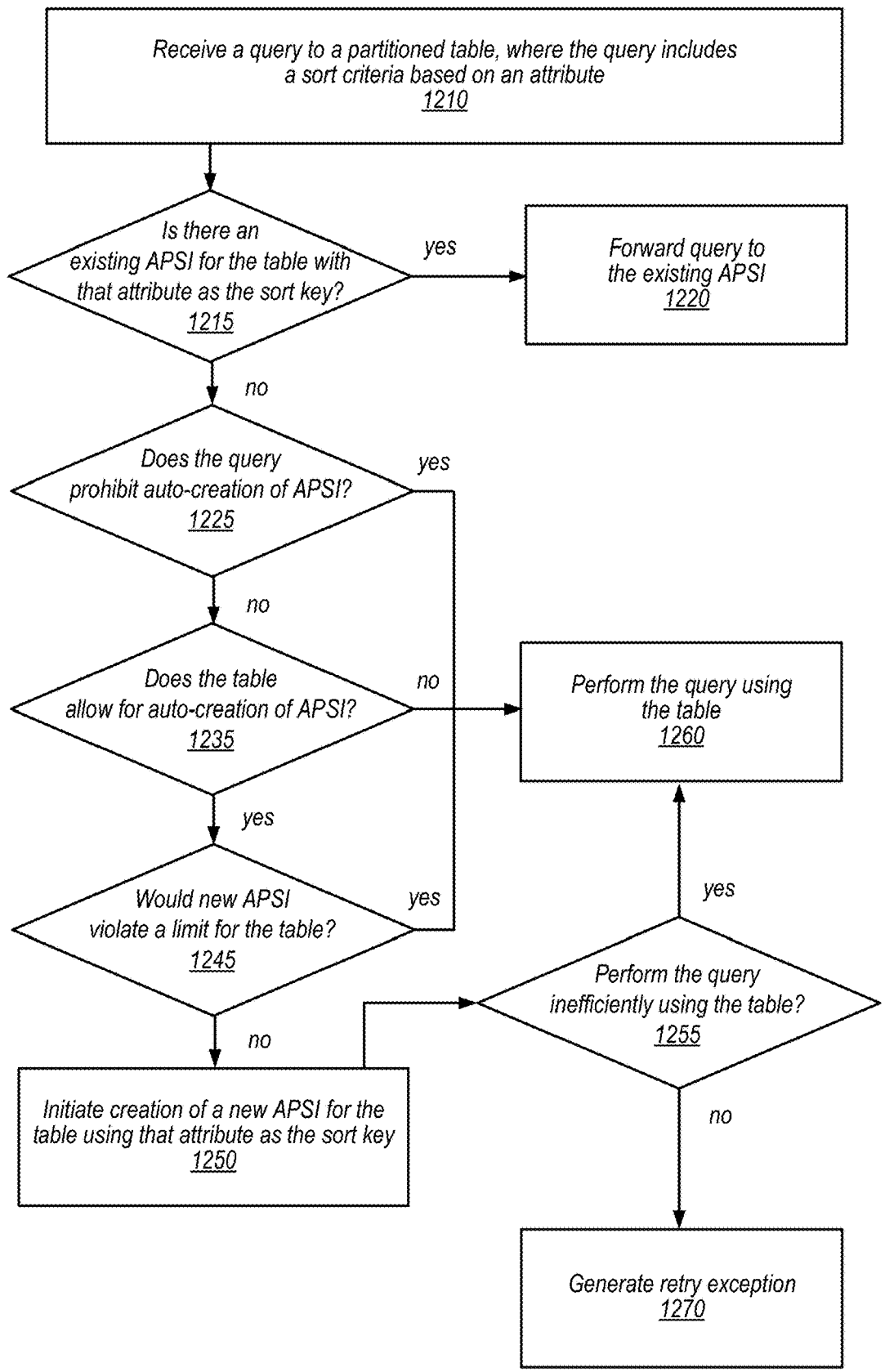
FIG. 12 is a flowchart illustrating an auto-creation an auto-partitioning secondary index, according to some embodiments.

FIG. 12 is a flowchart illustrating an auto-creation an auto-partitioning secondary index, according to some embodiments. The auto-creation process of FIG. 12 may be performed by the object request monitor 1114 and/or the APSI creation manager 1140, as discussed in connection with FIG. 11. As discussed, different portions of the auto-creation functionality may be implemented in data plane, the control plane, or both.

At operation 1210, a query is received to a partition table. The query may include a sort criteria or condition based on an attribute of the table. Operation 1210 may be performed by the object request handler 1112 of FIG. 11. The sort criteria may include different types of parameters specified in a query that require a sorting of an attribute. For example, the query may include a filter condition (e.g., top 5 results, range condition) that requires sorting of an attribute. A sort criteria or condition may also involve a "sort by" instruction in the query to return the results in sorted order. Other more complicated query directives may also be implemented (e.g., a query to report data in four quartile bins based on an attribute). In some cases, the sort criteria may include a sort based on multiple attributes. In that case, the APSI may be created with a compound sort key that includes the multiple attributes.

At operation 1215, a determination is made whether another APSI already exists for the table with the attribute specified in the sort condition as the sort key. For example, such an APSI may have been auto-created from a prior triggering query. If yes, the process proceeds to operation 1220, where the query is forwarded to that existing APSI for servicing. Depending on the embodiment, the existing APSI may provide the query results directly back to the client, or pass the query results back to the table's request handler. In some embodiments, the request handler of the table may be configured to always forward requests having a particular sort condition to an existing APSI, so that the client may simply always query against the table. If the determination is no, the process proceeds to operation 1225. In some embodiments, operation 1215 may determine that the creation of an appropriate APSI is already in progress. This may occur, for example, if the data store receives multiple queries in rapid succession that trigger the creation of the same type of APSI. In that case, the process may proceed directly to operation 1255, which either handles the query using the table, or generates a retry exception to the query client.

At operation 1225, a determination is made whether the query prohibits the auto-creation of an APSI. In some embodiments, the query may include a directive to prohibit auto-creation of APSIs. In some cases, the client may not wish to create an APSI on a table under certain circumstances, for example, during testing of a client application, or when the table's owner does not have full control over the types of queries that are issued to the table. If auto-creation of APSIs are prohibited by the query, the process proceeds to operation 1260 to perform the query using the table. If not, the process proceeds to operation 1235, where another check is performed.

At operation 1260, the query is performed using the table. This operation may be performed by the object request hander 1112, as discussed in connection in FIG. 11. Because the table does not store its data in sorted order to optimize for the query and the sort criteria, a full table scan may need to be performed to service the query.

At operation 1235, a determination is made whether the table allows for an auto-creation of the APSI. This operation may be performed by the object request handler 1114 or the APSI creation manager 1140 of FIG. 11. The conditions under which the table allows for APSI auto-creation may be specified the metadata for the table, which may be specified using the APSI auto-creation configuration interface 1130 of FIG. 11. Auto-creation of APSIs may be disallowed for a variety of configurable reasons. In some cases, a table may disallow any APSI auto-creations. In some cases, the client or administrator may specify that certain types of APSIs, for example APSIs having certain types of sort keys, should not be auto-created. In some embodiments, the administrator may disable auto-creation via an authorization policy for the table. For example, an administrator may allow auto-creation of APSIs during an application development period. After the application is published, the administrator may disable auto-creation of the APSI by changing the authorization policy. Depending on the embodiment, all of these conditions may be checked, and any of these conditions may prohibit the auto-creation of an APSI for the table. If the table does not allow for the auto-creation, the process proceeds to operation 1260 to, again, perform the query using just the table. If so, the process proceeds to operation 1245 for the next check.

At operation 1245, a determination is made whether a new APSI would violate a limit for the table. This operation may be performed by the object request handler 1114 or the APSI creation manager 1140 of FIG. 11. The limits that may prohibit an APSI auto-creation may be specified using the APSI auto-creation configuration interface 1130 of FIG. 11. In some embodiments, a table may only be permitted to have a certain maximum number of APSIs. For example, an additional APSI may exceed certain limits of the table, for example an overall number of object associated with a table, a provisioned throughput or storage limit associated with the table. Depending on the embodiment, all of these limits may be checked, and any of these limits may prohibit the auto-creation of an APSI for the table. If a table limit does not allow for the auto-creation, the process proceeds to operation 1260 to, again, perform the query using just the table. If no table limit prohibits the auto-creation, the process proceeds to operation 1250 to create the APSI. It should be noted that although the process in FIG. 12 involves the checks of certain conditions (e.g. operations 1215, 1225, 1235, and 1245), these checks are merely exemplary. Depending on the embodiment, other conditions may be checked prior to the creation of an APSI.

At operation 1250, the creation of a new APSI for the table is initiated. The new APSI will use the attribute included in the sort criteria of the query as the sort key attribute of the APSI. The operation may be performed by the APSI creation manager 1140 of FIG. 11. As explained earlier, the creation process itself may be a long running operation that involves copying of data from partitions of the table to the partitions of the APSI. In some embodiments, the creation may occur in the background while the storage service continues to function. When the creation process is completely, a notification may be generated to the control plane, e.g., to the APSI creation manager 1140, which may initiate an instance of the APSI to begin servicing requests.

At operation 1255, a determination is made whether the query should be performed inefficiently using the table. This operation may be performed by the object request handler 1114 or the APSI creation manager 1140 of FIG. 11. In some embodiments, the determination may be based on configuration settings specified, for example, via the APSI auto-creation configuration interface 1130 of FIG. 11. In some embodiments, the configuration settings may indicate that, in this situation, the pending query should fail. In that case, the process proceeds to operation 1270. In operation 1270, the storage service may generate an exception to the querying client. The query may indicate a retry exception, which indicates that the query has triggered a creation of a new APSI, and that the client should retry the query at a later time using the new APSI. Alternatively, the configuration settings may indicate that the pending query should not be failed, but instead be serviced inefficiently using the existing table. In that case, the process proceeds to operation 1260.

At operation 1260, the query is performed using the table. Because the table is not sorted using the sort attribute specified in the query, the performance of the query may be inefficient. For example, in some embodiments, the query may cause a full table scan of the table to perform the sorting criteria. As shown, operation 1260 may be the result of a number of conditions in the process indicating that creation of a new APSI to facilitate the query is not possible or not desired. In addition, even when a new APSI is created, the query may still be performed immediately using the table, per operation 1255, while the creation process proceeds in the background. However, in some embodiments, if a new APSI is created, future queries specifying the same sort attribute may be forwarded to the APSI, per operation 1220.

FIG. 13 illustrates an example user interface to configure the auto-creation of an auto-partitioning secondary index, according to some embodiments. FIG. 13 depicts a graphical user interface (GUI) panel 1300, which shows settings for a table in the storage service. Thus, in some embodiments, the APSI auto-creation behavior may be specified on a per-object basis. In some embodiments, APSI auto-creation settings may be specified for the entire storage service, certain user of the storage service, or a certain group of objects in the storage service. Although the figure shows one way of configuring such settings, in other embodiments, these settings may be configured via other means, for example, via configuration files or ad-hoc configuration commands.

As illustrated, GUI panel 1300 includes a number of tabs 1302, 1304, and 1306. In some embodiments, these tabs may correspond to different groups of configuration settings for the table in question. For example, tab 1302 may allow the user to configure attribute metadata for the table, such as keys and attribute settings. Tab 1304 may allow the user to configure the provisioned throughput requirements of the table, e.g., a peak rate of access requests that must be serviced by the table. Such requests may inform how much resources are provisioned by the storage service to the table (e.g., number of partitions, etc.), and may impact the cost the maintaining the table for the client. Finally, tab 1306, which is shown to be selected, relates to the APSI auto-creation settings.

Depending on the embodiment, the APSI auto-creation tab 1360 includes a number of different configuration settings. A person of ordinary skill would understand that these settings are merely exemplary. Other embodiments may include other configuration settings. As illustrated, the tab includes a checkbox 1310 that specifies whether APSI auto-creation is allowed or enabled for the table. In this case, if the checkbox 1310 is not checked, the rest of the configurable settings on the tab may simply be ignored by the system.

As illustrated, configuration setting 1320 indicates a maximum number of APSIs that are allowed for the table. This limitation may be in addition to the other limits that the storage service places on the creation of new objects. For example, in some embodiments where the table may receive a large variety of queries that are not predictable by the table's owner, the table owner may wish to limit the number of APSIs that are created by these queries. In some embodiments, the storage service itself may impose a further limit on the number of APSI that can be auto-created, that cannot be overridden by the user configuration settings.

As illustrated, configuration setting 1330 indicates the attribute projection behavior of the APSI auto-creation process. The configuration setting 1330 allows the user to select between two choices. In some embodiments, the table may simply project all attributes from the table, per the first choice. In other embodiments, the table may project only the attributes that are specified in the query that trigger the auto-creation, per the second choice. The first choice may generate an APSI that is more usable for a different variety of future queries that specify the same type of sort criteria. On the other hand, the second choice may be useful in situations where it is known a priori what attributes are needed for a particular type of query. Thus, in some embodiments, space may be saved for the APSI by only projecting attributes that are needed by the query.

As illustrated, configuration setting 1340 indicates two choices of how to handle the query that triggered the creation of the APSI. As discussed, in some embodiments, the creation of the APSI may be a long running process, because it may involve copying the data of the table into the APSI. Thus, in some embodiments, the trigger query may not be able to use the APSI immediately. In this situation, if the first choice is selected, the triggering query is simply handled using the existing table. In some embodiments, the query may be handled inefficiently using the table, because data in the table is not stored in sorted order according the sort attribute specified in the query. On the other hand, if the second choice is selected, in some embodiments, the storage service may not perform the query at all. Instead, the system may generate an exception suggesting that the client retry the query after some period of time, after the APSI has been created. At that time, the query may be more efficiently handled using the new APSI.

Figure 14:
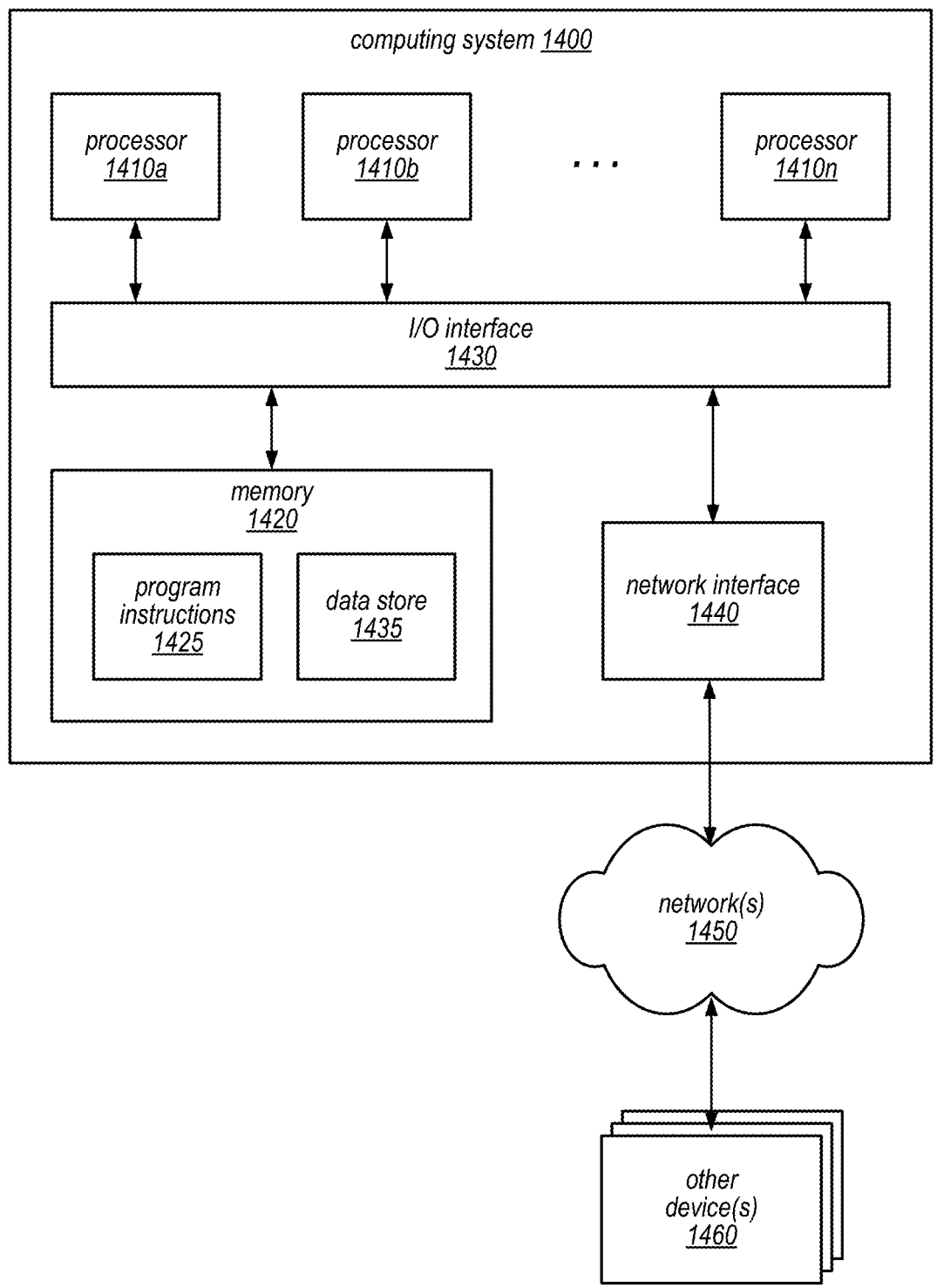
FIG. 14 is a block diagram illustrating an example computer system that can be used to implement one or more portions of a storage system that employs an auto-partitioning secondary index, according to some embodiments.

FIG. 14 is a block diagram illustrating an example computer system that can be used to implement one or more portions of a storage system that employs an auto-partitioning secondary index, according to some embodiments. Computer system 1400 may include or be configured to access one or more nonvolatile computer-accessible media. In the illustrated embodiment, computer system 1400 includes one or more processors 1410 coupled to a system memory 1420 via an input/output (I/O) interface 1430. Computer system 1400 further includes a network interface 1440 coupled to I/O interface 1430.

In various embodiments, computer system 1400 may be a uniprocessor system including one processor 1410, or a multiprocessor system including several processors 1410 (e.g., two, four, eight, or another suitable number). Processors 1410 may be any suitable processors capable of executing instructions. For example, in various embodiments, processors 1410 may be general-purpose or embedded processors implementing any of a variety of instruction set architectures (ISAs), such as the x86, PowerPC, SPARC, or MIPS ISAs, or any other suitable ISA. In multiprocessor systems, each of processors 1410 may commonly, but not necessarily, implement the same ISA.

System memory 1420 may be configured to store instructions and data accessible by processor(s) 1410. In various embodiments, system memory 1420 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1420 as code 1425 and data 1435.

In one embodiment, I/O interface 1430 may be configured to coordinate I/O traffic between processor 1410, system memory 1420, and any peripheral devices in the device, including network interface 1440 or other peripheral interfaces. In some embodiments, I/O interface 1430 may perform any necessary protocol, timing or other data transformations to convert data signals from one component (e.g., system memory 1420) into a format suitable for use by another component (e.g., processor 1410). In some embodiments, I/O interface 1430 may include support for devices attached through various types of peripheral buses, such as a variant of the Peripheral Component Interconnect (PCI) bus standard or the Universal Serial Bus (USB) standard, for example. In some embodiments, the function of I/O interface 1430 may be split into two or more separate components, such as a north bridge and a south bridge, for example. Also, in some embodiments some or all of the functionality of I/O interface 1430, such as an interface to system memory 920, may be incorporated directly into processor 1410.

Network interface 1440 may be configured to allow data to be exchanged between computer system 1400 and other devices 1460 attached to a network or networks 1450, such as other computer systems or devices, such as routers and other computing devices, as illustrated in FIGS. 1 through 13, for example. In various embodiments, network interface 1440 may support communication via any suitable wired or wireless general data networks, such as types of Ethernet network, for example. Additionally, network interface 1440 may support communication via telecommunications/telephony networks such as analog voice networks or digital fiber communications networks, via storage area networks such as Fibre Channel SANs, or via any other suitable type of network and/or protocol.

In some embodiments, system memory 1420 may be one embodiment of a computer-accessible medium configured to store program instructions and data as described above for FIGS. 1 through 13 for implementing embodiments of methods and apparatus for traffic analysis. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1400 via I/O interface 1430. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 1400 as system memory 1420 or another type of memory. Further, a computer-accessible medium may include transmission media or signals such as electrical, electromagnetic, or digital signals, conveyed via a communication medium such as a network and/or a wireless link, such as may be implemented via network interface 1440.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A method, comprising:
    receiving a query to a partitioned table, wherein the query includes a sort condition based on an attribute of the table; and
    responsive to the query, creating an auto-partitioning secondary index (APSI) for the table, wherein the creation of the APSI includes:
        generating a partition key for the APSI that is not a previously defined attribute of the partitioned table;
        generating, for individual data items in the table, respective partition key values of the partition key of the APSI, wherein the generated partition key values are to be stored in the APSI and independent from attribute values in the partitioned table;
        assigning the data items to respective partitions of the APSI according to their respective partition key values, wherein the generated partition key values cause the assignment to keep respective sizes of the partitions in relative balance; and
        storing the data items in their respective partitions in sorted order based on the attribute as a sort key;
    performing the query on the table without the APSI; and
    after completion of the creation of the APSI, performing a subsequent query on the table using the APSI, wherein the subsequent query includes another sort condition based on the attribute.

2. The method of claim 1, further comprising:
    initiate creation of a second APSI for a second partitioned table in response to a second query on the second table; and
    prior to completion of the creation of the second APSI, providing an exception to the second query indicating to retry the second query after completion of the creation of the second APSI.

3. The method of claim 1, further comprising:
    receiving a second query to the partitioned table, the second query including another sort condition based on the attribute but no query condition based on the partition key of the table; and
    servicing the second query using the APSI.

4. The method of claim 1, wherein the creation of the APSI is performed responsive to a determination that the table is configured to permit the creation.

5. A system, comprising:
    a storage service implemented by one or more compute nodes, each node implemented by one or more processors and associated memory storing program instructions that when executed cause the storage service to:
        receive a query to storage object partitioned according to a partition key, wherein the query includes a sort condition based on an attribute of the storage object; and
        responsive to the query, create an auto-partitioning secondary index (APSI) for the storage object, wherein the creation of the APSI includes to:
            generate a partition key for the APSI that is not a previously defined attribute of the partitioned table;
            generate, for individual data items in the table, respective partition key values of the partition key of the APSI, wherein the generated partition key values are to be stored in the APSI and independent from attribute values in the partitioned table;
            assign the data items to respective partitions of the APSI according to their respective partition key values, wherein the generated partition key values cause the assignment to keep respective sizes of the partitions in relative balance; and
            store the data items in their respective partitions in sorted order based on the attribute as a sort key;
        perform the query on the table without the APSI; and
        after completion of the creation of the APSI, perform a subsequent query on the table using the APSI, wherein the subsequent query includes another sort condition based on the attribute.

6. The system of claim 5, wherein the program instructions when executed cause the storage service to perform the creation of the APSI responsive to a determination that the storage object is configured to permit the creation.

7. The system of claim 6, wherein to determination that the storage object is configured to permit the creation, the program instructions when executed cause the storage service to determine that a number of existing APSIs associated with the storage object is below a limit.

8. The system of claim 5, wherein the program instructions when executed cause the storage service to refrain from performing the creation of the APSI responsive to a determination that the query prohibits the creation.

9. The system of claim 5, wherein the program instructions when executed cause the storage service to:
    initiate creation of a second APSI for a second partitioned table in response to a second query on the second table; and
    provide an exception in response to the second query indicating to retry the second query after completion of the creation of the second APSI.

10. The system of claim 5, wherein to create the APSI, the program instructions when executed cause the storage service to:
    initiate a copy process to copy the data items from the storage object to the APSI; and
    perform the query using the storage object during the copy process.

11. The system of claim 5, wherein to create the APSI, the program instructions when executed cause the storage service to project all attributes from the storage object to the APSI.

12. The system of claim 5, wherein to create the APSI, the program instructions when executed cause the storage service to project only attributes specified in the query to the APSI.

13. The system of claim 5, wherein the program instructions when executed cause the storage service to:
    receive a second query to the storage object, the second query including another sort condition based on the attribute but no query condition based on the partition key of the storage object; and service the second query using the APSI.

14. The system of claim 13, wherein the program instructions when executed cause the storage service to:

in response to the second query, send subqueries to each partition of the APSI in parallel; and aggregate query results from the respective partitions of the APSI generated in response to the respective subqueries to produce an aggregated query result for the second query.

15. A non-transitory computer-accessible storage medium storing program instructions that when executed on one or more processors of a storage service, cause the storage service to:

receive a query to a storage object partitioned according to a partition key, wherein the query includes a sort condition based on an attribute of the storage object; and responsive to the query, create an auto-partitioning secondary index (APSI) for the storage object, wherein the creation of the APSI includes to:

generate a partition key for the APSI that is not a previously defined attribute of the partitioned table;

generate, for individual data items in the table, respective partition key values of the partition key of the APSI, wherein the generated partition key values are to be stored in the APSI and independent from attribute values in the partitioned table;

assign the data items the data items are assigned to respective partitions of the APSI according to their respective partition key values, wherein the generated partition key values cause the assignment to keep respective sizes of the partitions in relative balance; and store the data items in their respective partitions in sorted order based on the attribute as a sort key;

perform the query on the table without the APSI; and after completion of the creation of the APSI, perform a subsequent query on the table using the APSI, wherein the subsequent query includes another sort condition based on the attribute.

16. The non-transitory computer-accessible storage medium of claim 15, wherein the program instructions when executed cause the storage service to:

initiate creation of a second APSI for a second partitioned table in response to a second query on the second table; and provide an exception in response to the second query indicating to retry the second query after completion of the creation of the second APSI.

17. The non-transitory computer-accessible storage medium of claim 15, wherein the program instructions when executed cause the storage service to perform the query using the storage object during the creation of the APSI.

18. The non-transitory computer-accessible storage medium of claim 15, wherein to create the APSI, the program instructions when executed cause the storage service to project all attributes from the storage object to the APSI.

19. The non-transitory computer-accessible storage medium of claim 15, wherein the program instructions when executed cause the storage service to:

receive a second query to the storage object, the second query including another sort condition based on the attribute but no query condition based on the partition key of the storage object; and service the second query using the APSI.

20. The non-transitory computer-accessible storage medium of claim 19, wherein the program instructions when executed cause the storage service to:

send subqueries in parallel to each partition of the APSI in response to the second query; and aggregate query results from the respective partitions of the APSI generated in response to the respective subqueries to produce an aggregated query result for the second query.

* * * * *